(12) United States Patent
Choi et al.

(10) Patent No.: US 9,930,596 B2
(45) Date of Patent: Mar. 27, 2018

(54) METHOD AND APPARATUS FOR CONTROLLING SMALL DATA TRANSMISSION ON THE UPLINK

(71) Applicant: Intel Corporation, Santa Clara, CA (US)

(72) Inventors: Hyung-Nam Choi, Hamburg (DE); Youn Hyoung Heo, San Jose, CA (US); Sangeetha L. Bangolae, Beaverton, OR (US); Mo-Han Fong, Sunnyvale, CA (US); Ana Lucia Pinheiro, Portland, OR (US); Marta Martinez Tarradell, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/124,939

(22) PCT Filed: Oct. 30, 2013

(86) PCT No.: PCT/US2013/067522
§ 371 (c)(1),
(2) Date: Dec. 9, 2013

(87) PCT Pub. No.: WO2014/070901
PCT Pub. Date: May 8, 2014

(65) Prior Publication Data
US 2015/0230234 A1 Aug. 13, 2015

Related U.S. Application Data

(60) Provisional application No. 61/721,436, filed on Nov. 1, 2012.

(51) Int. Cl.
*H04W 72/04* (2009.01)
*H04W 36/20* (2009.01)
(Continued)

(52) U.S. Cl.
CPC .......... *H04W 36/20* (2013.01); *H04B 7/0417* (2013.01); *H04B 7/0452* (2013.01);
(Continued)

(58) Field of Classification Search
None
See application file for complete search history.

(56) References Cited

U.S. PATENT DOCUMENTS 1,789,317 A 1/1931 McLeish
4,524,849 A 6/1985 Riddle
(Continued)

FOREIGN PATENT DOCUMENTS

CN 102340344 A 2/2012
CN 102724673 A 10/2012
(Continued)

OTHER PUBLICATIONS

3GPP TS 36.331 version 11.1.0 Release 11, Sep. 2011.*
(Continued)

*Primary Examiner* — Gregory Sefcheck
*Assistant Examiner* — Jenkey Van
(74) *Attorney, Agent, or Firm* — Schwegman Lundberg & Woessner, P.A.

(57) ABSTRACT

Apparatuses and methods for control of uplink transmission by a user equipment (UE) using machine-type communications (MTC) applications are described herein. The UE may transmit first data on a logical uplink channel. The logical uplink channel may have been assigned for use by machine-type communications (MTC) applications. The UE may receive transmission time restriction information, responsive to the transmitting, that indicates time periods during which the UE is permitted to transmit additional data on the logical uplink channel. The UE may refrain from transmitting additional data in a time period on the logical uplink channel based on the transmission time restriction information.

15 Claims, 5 Drawing Sheets

(51) Int. Cl.

| | | |
|---|---|---|
| H04W 28/24 | (2009.01) | |
| H04W 52/02 | (2009.01) | |
| H04W 24/08 | (2009.01) | |
| H04J 3/06 | (2006.01) | |
| H04L 5/00 | (2006.01) | |
| H04W 16/24 | (2009.01) | |
| H04W 8/00 | (2009.01) | |
| H04W 76/02 | (2009.01) | |
| H04B 7/0417 | (2017.01) | |
| H04B 7/0452 | (2017.01) | |
| H04B 7/06 | (2006.01) | |
| H04W 28/02 | (2009.01) | |
| H04W 4/00 | (2018.01) | |
| H04W 76/04 | (2009.01) | |
| H04L 29/12 | (2006.01) | |
| H04W 16/20 | (2009.01) | |
| H04W 16/26 | (2009.01) | |
| H04W 60/04 | (2009.01) | |
| H04W 64/00 | (2009.01) | |
| H04W 36/14 | (2009.01) | |
| H04W 24/10 | (2009.01) | |
| H04J 11/00 | (2006.01) | |
| H04W 28/04 | (2009.01) | |
| H04W 72/06 | (2009.01) | |
| H04W 72/08 | (2009.01) | |
| H04W 36/30 | (2009.01) | |
| H04W 72/12 | (2009.01) | |
| H04W 24/04 | (2009.01) | |
| H04W 88/02 | (2009.01) | |
| H04W 88/08 | (2009.01) | |
| H04W 88/06 | (2009.01) | |
| H04W 88/16 | (2009.01) | |
| H04W 24/02 | (2009.01) | |

(52) U.S. Cl.
CPC .......... *H04B 7/0626* (2013.01); *H04J 3/0614* (2013.01); *H04J 11/00* (2013.01); *H04L 5/0046* (2013.01); *H04L 5/0048* (2013.01); *H04L 61/3005* (2013.01); *H04L 61/3075* (2013.01); *H04W 4/005* (2013.01); *H04W 8/005* (2013.01); *H04W 16/20* (2013.01); *H04W 16/24* (2013.01); *H04W 16/26* (2013.01); *H04W 24/04* (2013.01); *H04W 24/08* (2013.01); *H04W 24/10* (2013.01); *H04W 28/0268* (2013.01); *H04W 28/046* (2013.01); *H04W 28/24* (2013.01); *H04W 36/14* (2013.01); *H04W 36/30* (2013.01); *H04W 52/0216* (2013.01); *H04W 52/0235* (2013.01); *H04W 60/04* (2013.01); *H04W 64/003* (2013.01); *H04W 72/042* (2013.01); *H04W 72/0413* (2013.01); *H04W 72/0446* (2013.01); *H04W 72/06* (2013.01); *H04W 72/08* (2013.01); *H04W 72/1231* (2013.01); *H04W 76/023* (2013.01); *H04W 76/046* (2013.01); *H04W 76/048* (2013.01); *H04L 5/006* (2013.01); *H04W 24/02* (2013.01); *H04W 88/02* (2013.01); *H04W 88/06* (2013.01); *H04W 88/08* (2013.01); *H04W 88/16* (2013.01); *Y02B 60/50* (2013.01)

(56) References Cited

U.S. PATENT DOCUMENTS

| | | |
|---|---|---|
| 5,685,391 A | 11/1997 | Gundlach |
| 6,386,320 B1 | 5/2002 | Clavel |
| 7,965,651 B2 | 6/2011 | Du et al. |
| 8,072,963 B2 | 12/2011 | Suzuki |
| 8,150,477 B2 | 4/2012 | Cho et al. |
| 8,174,957 B2 | 5/2012 | Ko et al. |
| 8,504,086 B2 | 8/2013 | So |
| 8,599,715 B2 | 12/2013 | Kim et al. |
| 8,660,197 B2 | 2/2014 | Lindgren et al. |
| 8,681,627 B2 | 3/2014 | Choudhury et al. |
| 8,792,426 B2 | 7/2014 | Montojo et al. |
| 8,885,458 B2 | 11/2014 | Diachina et al. |
| 8,917,702 B2 | 12/2014 | Wegmann et al. |
| 9,042,881 B2 | 5/2015 | Kwon et al. |
| 9,100,160 B2 | 8/2015 | Tarradell et al. |
| 9,225,399 B2 | 12/2015 | Shan et al. |
| 9,225,759 B2 | 12/2015 | Vannithamby et al. |
| 9,253,698 B2 | 2/2016 | Zhang et al. |
| 9,277,471 B2 | 3/2016 | He et al. |
| 9,363,727 B2 | 6/2016 | Chou et al. |
| 9,420,511 B2 | 8/2016 | Gupta Hyde et al. |
| 9,572,077 B2 | 2/2017 | Lane et al. |
| 9,585,075 B2 | 2/2017 | Khoryaev et al. |
| 9,609,564 B2 | 3/2017 | Davydov et al. |
| 9,674,753 B2 | 6/2017 | He et al. |
| 2001/0051994 A1 | 12/2001 | Serizawa et al. |
| 2003/0072392 A1 | 4/2003 | Beadle et al. |
| 2003/0226096 A1 | 12/2003 | Shen et al. |
| 2004/0208183 A1 | 10/2004 | Balachandran et al. |
| 2005/0008081 A1 | 1/2005 | Yamazaki et al. |
| 2005/0026616 A1 | 2/2005 | Cavalli et al. |
| 2005/0032555 A1 | 2/2005 | Jami et al. |
| 2005/0117491 A1 | 6/2005 | Sako et al. |
| 2005/0120265 A1 | 6/2005 | Pline et al. |
| 2005/0124372 A1 | 6/2005 | Lundby et al. |
| 2005/0135468 A1 | 6/2005 | Asuri et al. |
| 2005/0146829 A1 | 7/2005 | Schoenborn |
| 2005/0148348 A1 | 7/2005 | Cramby et al. |
| 2005/0246080 A1 | 11/2005 | Watkins et al. |
| 2006/0058033 A1 | 3/2006 | Marsan et al. |
| 2006/0104379 A1 | 5/2006 | Li et al. |
| 2006/0117155 A1 | 6/2006 | Ware et al. |
| 2006/0126708 A1 | 6/2006 | Van Den Bogaert |
| 2006/0286946 A1 | 12/2006 | Akkarakaran et al. |
| 2007/0044000 A1 | 2/2007 | Shen et al. |
| 2007/0111747 A1 | 5/2007 | Lundby et al. |
| 2007/0298725 A1 | 12/2007 | Ryu |
| 2008/0188247 A1 | 8/2008 | Worrall |
| 2009/0129259 A1 | 5/2009 | Malladi et al. |
| 2009/0238131 A1 | 9/2009 | Montojo et al. |
| 2009/0245187 A1 | 10/2009 | Nam et al. |
| 2009/0268624 A1 | 10/2009 | Imamura et al. |
| 2010/0074109 A1 | 3/2010 | Klingenbrunn et al. |
| 2010/0097937 A1 | 4/2010 | Pietraski et al. |
| 2010/0113060 A1 | 5/2010 | Bai et al. |
| 2010/0216453 A1 | 8/2010 | Kallin et al. |
| 2010/0272037 A1 | 10/2010 | Lee et al. |
| 2010/0278038 A1 | 11/2010 | Stahle et al. |
| 2011/0038279 A1 | 2/2011 | Cho et al. |
| 2011/0038326 A1 | 2/2011 | Davies et al. |
| 2011/0043275 A1 | 2/2011 | Fuks et al. |
| 2011/0044165 A1 | 2/2011 | Ni et al. |
| 2011/0059744 A1 | 3/2011 | Won et al. |
| 2011/0065443 A1 | 3/2011 | Yellin et al. |
| 2011/0110347 A1 | 5/2011 | Mun |
| 2011/0149728 A1 | 6/2011 | Lee |
| 2011/0190000 A1 | 8/2011 | Kwun |
| 2011/0205886 A1 | 8/2011 | Maruyama et al. |
| 2011/0244877 A1 | 10/2011 | Farajidana et al. |
| 2011/0267854 A1 | 11/2011 | Flannery et al. |
| 2011/0294491 A1 | 12/2011 | Fong et al. |
| 2011/0300858 A1* | 12/2011 | Lee ............... H04W 28/10 455/425 |
| 2011/0310769 A1* | 12/2011 | Lee ............... H04W 4/005 370/254 |
| 2011/0319065 A1 | 12/2011 | Dalsgaard et al. |
| 2012/0033643 A1 | 2/2012 | Noh et al. |
| 2012/0039252 A1 | 2/2012 | Damnjanovic et al. |
| 2012/0039298 A1 | 2/2012 | Lee et al. |
| 2012/0052860 A1 | 3/2012 | Faronius et al. |
| 2012/0057479 A1 | 3/2012 | Maruyama et al. |

(56) References Cited

U.S. PATENT DOCUMENTS

| | | |
|---|---|---|
| 2012/0083283 A1 | 4/2012 | Phan et al. |
| 2012/0093124 A1 | 4/2012 | Zhang et al. |
| 2012/0102240 A1 | 4/2012 | Wei et al. |
| 2012/0106517 A1 | 5/2012 | Charbit et al. |
| 2012/0113844 A1 | 5/2012 | Krishnamurthy |
| 2012/0155406 A1 | 6/2012 | Kim et al. |
| 2012/0176885 A1 | 7/2012 | Lee et al. |
| 2012/0176924 A1 | 7/2012 | Wu et al. |
| 2012/0207047 A1 | 8/2012 | Liao |
| 2012/0207105 A1 | 8/2012 | Geirhofer et al. |
| 2012/0213057 A1 | 8/2012 | Zhang et al. |
| 2012/0213116 A1 | 8/2012 | Koo et al. |
| 2012/0213137 A1 | 8/2012 | Jeong et al. |
| 2012/0218913 A1 | 8/2012 | Park et al. |
| 2012/0220286 A1 | 8/2012 | Chen et al. |
| 2012/0230290 A1 | 9/2012 | Seo et al. |
| 2012/0250662 A1 | 10/2012 | Kuo |
| 2012/0252518 A1 | 10/2012 | Karampatsis et al. |
| 2012/0264483 A1 | 10/2012 | Chin et al. |
| 2012/0300685 A1 | 11/2012 | Kim et al. |
| 2012/0320791 A1 | 12/2012 | Guo et al. |
| 2013/0005385 A1 | 1/2013 | Hunukumbure et al. |
| 2013/0039439 A1 | 2/2013 | Kameya |
| 2013/0051277 A1 | 2/2013 | Hakola et al. |
| 2013/0053024 A1 | 2/2013 | Zou et al. |
| 2013/0077484 A1* | 3/2013 | Zhao ............... H04W 4/005 370/230 |
| 2013/0077583 A1* | 3/2013 | Kim ................. H04W 4/005 370/329 |
| 2013/0080597 A1 | 3/2013 | Liao |
| 2013/0089065 A1 | 4/2013 | Koorapaty et al. |
| 2013/0107778 A1 | 5/2013 | Ryu et al. |
| 2013/0170467 A1 | 7/2013 | Ogawa et al. |
| 2013/0195041 A1* | 8/2013 | Papasakellariou .. H04W 72/042 370/329 |
| 2013/0195070 A1 | 8/2013 | Bashar et al. |
| 2013/0196679 A1* | 8/2013 | Widell ............ H04W 28/0289 455/453 |
| 2013/0258874 A1 | 10/2013 | Khoshnevis et al. |
| 2013/0294307 A1 | 11/2013 | Johansson et al. |
| 2013/0295905 A1 | 11/2013 | Islam et al. |
| 2013/0301558 A1* | 11/2013 | Zakrzewski ...... H04W 28/0215 370/329 |
| 2013/0303206 A1 | 11/2013 | Starsinic et al. |
| 2013/0329545 A1 | 12/2013 | Wu et al. |
| 2013/0343252 A1 | 12/2013 | Chakraborty et al. |
| 2014/0016614 A1 | 1/2014 | Velev et al. |
| 2014/0016714 A1 | 1/2014 | Chen et al. |
| 2014/0018085 A1 | 1/2014 | Young et al. |
| 2014/0029625 A1 | 1/2014 | Edmiston |
| 2014/0036750 A1 | 2/2014 | Yavuz et al. |
| 2014/0036795 A1 | 2/2014 | Martinez Tarradell et al. |
| 2014/0044029 A1 | 2/2014 | Chou et al. |
| 2014/0050086 A1 | 2/2014 | Himayat et al. |
| 2014/0057640 A1 | 2/2014 | Nagata et al. |
| 2014/0071952 A1 | 3/2014 | Kim et al. |
| 2014/0086174 A1 | 3/2014 | Nam et al. |
| 2014/0092733 A1* | 4/2014 | Johansson ......... H04W 52/0216 370/230 |
| 2014/0094125 A1* | 4/2014 | Behravan ............ H04W 24/02 455/63.1 |
| 2014/0112194 A1 | 4/2014 | Novlan et al. |
| 2014/0113667 A1 | 4/2014 | Keller et al. |
| 2014/0119261 A1* | 5/2014 | Wang ................ H04W 72/04 370/312 |
| 2014/0120967 A1 | 5/2014 | Purnadi et al. |
| 2014/0226616 A1 | 8/2014 | Ihm et al. |
| 2014/0269383 A1 | 9/2014 | He et al. |
| 2014/0269779 A1 | 9/2014 | Shan et al. |
| 2014/0286215 A1 | 9/2014 | Koc et al. |
| 2014/0286302 A1 | 9/2014 | Khoryaev et al. |
| 2014/0295856 A1 | 10/2014 | Chou et al. |
| 2014/0321296 A1 | 10/2014 | Balraj |
| 2014/0357259 A1 | 12/2014 | Tomeczko et al. |
| 2015/0009928 A1 | 1/2015 | Sohn |
| 2015/0029874 A1 | 1/2015 | Davydov et al. |
| 2015/0043438 A1 | 2/2015 | Fwu et al. |
| 2015/0092738 A1 | 4/2015 | Chakraborty et al. |
| 2015/0171939 A1 | 6/2015 | Davydov et al. |
| 2015/0215928 A1 | 7/2015 | Davydov et al. |
| 2015/0230179 A1 | 8/2015 | Gupta et al. |
| 2015/0230214 A1 | 8/2015 | Tong et al. |
| 2015/0237521 A1 | 8/2015 | Davydov et al. |
| 2015/0245221 A1 | 8/2015 | Yiu et al. |
| 2015/0249947 A1 | 9/2015 | Zhang et al. |
| 2015/0271868 A1 | 9/2015 | Rune et al. |
| 2015/0304076 A1 | 10/2015 | Lee, II et al. |
| 2015/0358931 A1 | 12/2015 | Koorapaty et al. |
| 2016/0157241 A1 | 6/2016 | He et al. |
| 2016/0183281 A1 | 6/2016 | Yeh et al. |

FOREIGN PATENT DOCUMENTS

| | | |
|---|---|---|
| CN | 104782157 A | 7/2015 |
| CN | 104782166 A | 7/2015 |
| CN | 104885514 A | 9/2015 |
| CN | 104904137 A | 9/2015 |
| CN | 104904256 A | 9/2015 |
| CN | 104937977 A | 9/2015 |
| CN | 105637917 A | 6/2016 |
| EP | 2154918 A1 | 2/2010 |
| EP | 2369883 A1 | 9/2011 |
| EP | 2624473 A2 | 8/2013 |
| EP | 2733983 A2 | 5/2014 |
| EP | 2782389 A2 | 9/2014 |
| EP | 2915368 A1 | 9/2015 |
| KR | 1020090093758 A | 9/2009 |
| KR | 1020110011145 A | 2/2011 |
| KR | 1020120033283 A | 4/2012 |
| KR | 1020120094369 A | 8/2012 |
| KR | 1020120096408 A | 8/2012 |
| WO | WO-0251189 A1 | 6/2002 |
| WO | WO-2004045083 A2 | 5/2004 |
| WO | WO-2004114683 A2 | 12/2004 |
| WO | WO-2011105726 A2 | 9/2011 |
| WO | WO-2011123550 A1 | 10/2011 |
| WO | WO-2011134401 A1 | 11/2011 |
| WO | WO-2011149533 A1 | 12/2011 |
| WO | WO-2012021879 A2 | 2/2012 |
| WO | WO-20120025825 | 3/2012 |
| WO | WO-2012044328 A1 | 4/2012 |
| WO | WO-2012050503 A1 | 4/2012 |
| WO | WO-2012063041 A1 | 5/2012 |
| WO | WO-2012065033 A1 | 5/2012 |
| WO | WO-2012067555 A1 | 5/2012 |
| WO | WO-2012109989 A1 | 8/2012 |
| WO | WO-2012111937 A2 | 8/2012 |
| WO | WO-2012112281 A2 | 8/2012 |
| WO | WO-2012121757 A1 | 9/2012 |
| WO | WO-2012134579 A1 | 10/2012 |
| WO | WO-2012141884 A1 | 10/2012 |
| WO | WO-2012144645 A1 | 10/2012 |
| WO | WO-2013064385 A1 | 5/2013 |
| WO | WO-2014/070410 A1 | 5/2014 |
| WO | WO-2014070321 A1 | 5/2014 |
| WO | WO-2014070347 A1 | 5/2014 |
| WO | WO-2014070359 A1 | 5/2014 |
| WO | WO-2014070411 A1 | 5/2014 |
| WO | WO-2014070480 A1 | 5/2014 |
| WO | WO-2014070602 A1 | 5/2014 |
| WO | WO-2014070649 A1 | 5/2014 |
| WO | WO-2014070768 A1 | 5/2014 |
| WO | WO-2014070778 A1 | 5/2014 |
| WO | WO-2014070901 A1 | 5/2014 |
| WO | WO-2014070929 A1 | 5/2014 |
| WO | WO-2014070933 A1 | 5/2014 |

OTHER PUBLICATIONS

"3GPP MTC Standard TTA M2M Seminar", ETRI Standards Research Center, [Online] retrieved from the internet: <edu.tta.or.kr/sub3/down.php?No=123&file=M2M_1-4.pdf>, (Oct. 23, 2012).

(56) References Cited

OTHER PUBLICATIONS

"U.S. Appl. No. 14/126,611, Non Final Office Action dated Oct. 23, 2014", 10 pgs.
"U.S. Appl. No. 14/126,654, Non Final Office Action dated Nov. 6, 2014", 34 pgs.
"The Mobile Broadband Standard", 3GPP List of Work Items, [Online] retrieved from the internet: <http://www.3gpp.org/DynaReport/WI-List.html>.
"U.S. Appl. No. 14/126,611, Final Office Action dated May 22, 2015", 11 pgs.
"U.S. Appl. No. 14/126,611, Response filed Jan. 23, 2015 to Non Final Office Action dated Oct. 23, 2014", 12 pgs.
"U.S. Appl. No. 14/126,654, Examiner Interview Summary dated Feb. 25, 2015", (5 pgs).
"U.S. Appl. No. 14/126,654, Response fled Mar. 6, 2015 to Non Final Office Action dated Nov. 6, 2014", 18 pgs.
"International Application Serial No. PCT/US2013/060146, International Preliminary Report on Patentability dated May 14, 2015", 7 pgs.
"International Application Serial No. PCT/US2013/062442, International Preliminary Report on Patentability dated May 14, 2015", 11 pgs.
"International Application Serial No. PCT/US2013/063063, International Preliminary Report on Patentability dated May 14, 2015", 6 pgs.
"International Application Serial No. PCT/US2013/064385, International Preliminary Report on Patentability dated May 14, 2015", 10 pgs.
"International Application Serial No. PCT/US2013/064387, International Preliminary Report on Patentability dated May 14, 2015", 6 pgs.
"International Application Serial No. PCT/US2013/065599, International Preliminary Report on Patentability dated May 14, 2015", 6 pgs.
"International Application Serial No. PCT/US2013/066786, International Preliminary Report on Patentability dated May 14, 2015", 8 pgs.
"International Application Serial No. PCT/US2013/067043, International Preliminary Report on Patentability dated May 14, 2015", 8 pgs.
"International Application Serial No. PCT/US2013/067306, International Preliminary Report on Patentability dated May 14, 2015", 9 pgs.
"International Application Serial No. PCT/US2013/067317, International Preliminary Report on Patentability dated May 14, 2015", 9 pgs.
"International Application Serial No. PCT/US2013/067522, International Preliminary Report on Patentability dated May 14, 2015", 8 pgs.
"International Application Serial No. PCT/US2013/067575, International Preliminary Report on Patentability dated May 14, 2015", 8 pgs.
"International Application Serial No. PCT/US2013/067582, International Preliminary Report on Patentability dated May 14, 2015", 6 pgs.
"3GPP TSG-SA5 Meeting #86 Change Request 32.762", New Orleans. S5-123029., (Nov. 12, 2012), 14 pgs.
"U.S. Appl. No. 14/119,228, Preliminary Amendment filed Nov. 21, 2013", 9 pgs.
"U.S. Appl. No. 14/124,457, Preliminary Amendment filed Dec. 6, 2013", 7 pgs.
"U.S. Appl. No. 14/124,964, Preliminary Amendment filed Dec. 9, 2013", 9 pgs.
"U.S. Appl. No. 14/125,472, Preliminary Amendment filed Dec. 11, 2013", 9 pgs.
"U.S. Appl. No. 14/125,767, Preliminary Amendment filed Dec. 12, 2013", 11 pgs.
"U.S. Appl. No. 14/126,611, Preliminary Amendment filed Dec. 16, 2013", 11 pgs.
"U.S. Appl. No. 14/126,654, Preliminary Amendment filed Dec. 16, 2013", 10 pgs.
"U.S. Appl. No. 14/126,998, Preliminary Amendment filed Dec. 17, 2013", 8 pgs.
"U.S. Appl. No. 14/127,015, Preliminary Amendment filed Dec. 17, 2013", 8 pgs.
"U.S. Appl. No. 14/127,092, Preliminary Amendment filed Dec. 17, 2013", 10 pgs.
"U.S. Appl. No. 14/127,621, Preliminary Amendment filed Dec. 19, 2013", 8 pgs.
"CSI Collision Handling for CoMP", R1-123468, 3GPP TSG RAN WG1 #70, Samsung, (Aug. 2012), 3 pgs.
"Discussion on reduction of CSI processing complexity to support CoMP", R1-124368, 3GPP TSG RAN WG1 #70bis, Samsung, (Oct. 2012), 4 pgs.
"Evaluation of MTC Device triggering", HTC, TD S2-110732, 3GPP TSG SA WG2 Meeting #83, (Feb. 2011), 2 pgs.
"International Application Serial No. PCT/US2013/060146, International Search Report dated Dec. 27, 2013", 5 pgs.
"International Application Serial No. PCT/US2013/060146, Written Opinion dated Dec. 27, 2013", 5 pgs.
"International Application Serial No. PCT/US2013/062442, International Search Report dated Feb. 18, 2014", 10 pgs.
"International Application Serial No. PCT/US2013/062442, Written Opinion dated Feb. 18, 2014", 9 pgs.
"International Application Serial No. PCT/US2013/063063, International Search Report dated Dec. 31, 2013", 5 pgs.
"International Application Serial No. PCT/US2013/063063, Written Opinion dated Dec. 31, 2013", 4 pgs.
"International Application Serial No. PCT/US2013/064385, International Search Report dated Jan. 29, 2014", 3 pgs.
"International Application Serial No. PCT/US2013/064385, Written Opinion dated Jan. 29, 2014", 8 pgs.
"International Application Serial No. PCT/US2013/064387, International Search Report dated Jan. 28, 2014", 4 pgs.
"International Application Serial No. PCT/US2013/064387, Written Opinion dated Jan. 28, 2014", 4 pgs.
"International Application Serial No. PCT/US2013/065599, International Search Report dated Feb. 10, 2014", 4 pgs.
"International Application Serial No. PCT/US2013/065599, Written Opinion dated Feb. 10, 2014", 4 pgs.
"International Application Serial No. PCT/US2013/066786, International Search Report dated Feb. 12, 2014", 4 pgs.
"International Application Serial No. PCT/US2013/066786, Written Opinion dated Feb. 12, 2014", 6 pgs.
"International Application Serial No. PCT/US2013/067043, International Search Report dated Feb. 25, 2014", 4 pgs.
"International Application Serial No. PCT/US2013/067043, Written Opinion dated Feb. 25, 2014", 6 pgs.
"International Application Serial No. PCT/US2013/067306, International Search Report dated Jan. 17, 2014", 3 pgs.
"International Application Serial No. PCT/US2013/067306, Written Opinion dated Jan. 17, 2014", 7 pgs.
"International Application Serial No. PCT/US2013/067317, International Search Report dated Feb. 7, 2014", 3 pgs.
"International Application Serial No. PCT/US2013/067317, Written Opinion dated Feb. 7, 2014", 7 pgs.
"International Application Serial No. PCT/US2013/067522, International Search Report dated Feb. 12, 2014", 3 pgs.
"International Application Serial No. PCT/US2013/067522, Written Opinion dated Feb. 12, 2014", 6 pgs.
"International Application Serial No. PCT/US2013/067575, International Search Report dated Feb. 21, 2014", 3 pgs.
"International Application Serial No. PCT/US2013/067575, Written Opinion dated Feb. 21, 2014", 6 pgs.
"International Application Serial No. PCT/US2013/067582, International Search Report dated Nov. 27, 2013", 3 pgs.
"International Application Serial No. PCT/US2013/067582, Written Opinion dated Nov. 27, 2013", 4 pgs.
"Radio Frequency (RF) requirements for Multicarrier and Multiple Radio Access Technology (Multi-RAT) Base Station (BS)", 3GPP TR 37.900 V11.0.0. Technical Specification Group Radio Access Network. Release 11., (Sep. 24, 2012), 75 pgs.

(56) References Cited

OTHER PUBLICATIONS

"Relay System Simulation Results with Coverage Boosting and Control Channel Modeling", 3GPP TSG RAN WG1 Meeting #59, R1-094838, Motorola, (2009), 12 pgs.

"Telecommunication management; Self-Organizing Networks (SON); Self-healing concepts and requirements", 3GPP TS 32.541 V10.0.0. Technical Specification Group Services and System Aspects. Release 10., (Mar. 2011), 21 pgs.

"Triggering a detached MTC device", InterDigital Communications, TD S2-110673, 3GPP TSG SA WG2 Meeting #83, (Feb. 2011), 4 pgs.

"TSG-SA5 Meeting #86 Change Request 32.766", New Orleans. S5-123194., (Nov. 12, 2012), 26 pgs.

Doppler, Klaus, et al., "Device-to-Device Communication as an Underlay to LTE-Advanced Networks", IEEE Communications Magazine, 47(12), (Dec. 2009), 42-49.

Lei, Lei, et al., "Operator controlled device-to-device communications in LTE-advanced networks", IEEE Wireless Communications, 19(3), (Jun. 2012), 96-104.

U.S. Appl. No. 14/126,654, filed Dec. 16, 2013, Channel State Information Feedback Scheme for Cooperative Multi Point Transmission and Carrier Aggregation Scenario.

U.S. Appl. No. 14/127,092, filed Dec. 17, 2013, Signaling QOS Requirements and UE Power Preference in LTE-A Networks.

U.S. Appl. No. 14/127,621, filed Dec. 19, 2013, Extended Discontinuous Reception (DRX) Cycle Length in Wireless Communication Networks.

U.S. Appl. No. 14/126,998, filed Dec. 17, 2013, Long-Term Evolution Device-to-Device Discovery Using Control Channel.

U.S. Appl. No. 14/127,015, filed Dec. 17, 2013, Methods for Improving On-Time Throughput in Wireless Networks.

U.S. Appl. No. 14/125,472, filed Dec. 11, 2013, Fast Modulation and Coding Scheme Adaptation Protocol for Long Term Evolution With Multiple-User Multiple-Input, Multiple Output.

U.S. Appl. No. 14/124,964, filed Dec. 9, 2013, Coverage Boosting Transmission Method for LTE Technology.

U.S. Appl. No. 14/125,767, filed Dec. 12, 2013, Frequency Offset Measurement Enhancements for Long Term Evolution (LTE).

U.S. Appl. No. 14/126,611, filed Dec. 16, 2013, Method to Enable Optimization for Small Data in an Evolved Packet Core (EPC).

"U.S. Appl. No. 14/119,228, Non Final Office Action dated Jun. 19, 2015", 6 pgs.

"U.S. Appl. No. 14/119,228, Response filed Jul. 31, 2015 to Non Final Office Action dated Jun. 19, 2015", 10 pgs.

"U.S. Appl. No. 14/124,457, Non Final Office Action dated Jul. 15, 2015", 18 pgs.

"U.S. Appl. No. 14/126,611, Notice of Allowance dated Aug. 19, 2015", 12 pgs.

"U.S. Appl. No. 14/126,611, Response filed Jul. 24, 2015 to Final Office Action dated May 22, 2015", 9 pgs.

"U.S. Appl. No. 14/126,654, Final Office Action dated Jun. 18, 2015", 36 pgs.

"U.S. Appl. No. 14/126,654, Response filed Aug. 28, 2015 to Final Office Action dated Jun. 18, 2015", 15 pgs.

"U.S. Appl. No. 14/127,092, Non Final Office Action dated Jul. 6, 2015", 28 pgs.

"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.

"Evolved Universal Terrestrial Radio Access (E-UTRA); Radio Resource Control (RRC);", 3GPP TS 36.331 V11.1.0 (Sep. 2012) Technical Specification Group Radio Access Network; Protocol specification (Release 11), (Sep. 2012), 325 pgs.

"Evolved Universal Terrestrial Radio Access (E-UTRA); Study on signalling and procedure for interference avoidance for in-device coexistence", 3GPP TR 36.816 V11.1.0 (Sep. 2011) Technical Specification Group Radio Access Network (Release 11), (Sep. 2011), 44 pgs.

"Inter-RAT mobility for UE under IDC interference", 3GPP TSG-RAN WG2 #79bis; R2-124725; Agenda Item 7.6.3; LG Electronics Inc., (Oct. 8, 2012), 1 pg.

"Inter-RAT operation for in-device coexistence", 3GPP TSG RAN WG2 Meeting #80; R2-125750; Agenda Item 7.6.1; Intel Corporation, (Nov. 12, 2012), 2 pgs.

"Title Change Request", 3GPP TSG-RAN WG2 Meeting #79bis; R2-125108, (Oct. 8, 2012), 5 pgs.

Hong, Wei, et al., "Considering In-Device Coexistence interference from WiFi point of view", IEEE 802.11-13/0880-00, (Jul. 17, 2013), 13 pgs.

"U.S. Appl. No. 14/126,998, Non Final Office Action dated Nov. 28, 2016", 27 pgs.

"U.S. Appl. No. 14/124,964, Notice of Allowance dated Oct. 19, 2016", 15 pgs.

"U.S. Appl. No. 14/125,472, Notice of Allowance dated Nov. 8, 2016", 5 pgs.

"U.S. Appl. No. 14/126,998, Response filed Oct. 11, 2016 to Final Office Action dated May 12, 2016", 8 pgs.

"U.S. Appl. No. 14/127,015, Response filed Oct. 18, 2016 to Non Final Office Action dated Jul. 18, 2016", 9 pgs.

"U.S. Appl. No. 14/990,239, Corrected Notice of Allowance dated Oct. 26, 2016", 2 pgs.

"U.S. Appl. No. 14/990,239, Notice of Allowance dated Oct. 5, 2016", 7 pgs.

"U.S. Appl. No. 15/013,658, Final Office Action dated Oct. 21, 2016", 43 pgs.

"Korean Application Serial No. 2015-7008322, Response filed Sep. 22, 2016 to Office Action dated Jul. 22, 2016", W/ English Translation of Claims, 33 pgs.

"U.S. Appl. No. 14/125,472, Notice of Allowability dated Jan. 23, 2017", 2 pgs.

"U.S. Appl. No. 14/126,998, Response filed Mar. 28, 2017 to Non Final Office Action dated Nov. 28, 2016", 9 jpgs.

"U.S. Appl. No. 14/127,015, Advisory Action dated Mar. 28, 2017", 3 pgs.

"U.S. Appl. No. 14/127,015, Final Office Action dated Dec. 13, 2016", 9 pgs.

"U.S. Appl. No. 14/127,015, Response filed Mar. 13, 2017 to Final Office Action dated Dec. 13, 2016", 12 pgs.

"U.S. Appl. No. 14/127,621, Final Office Action dated Mar. 7, 2017", 30 pgs.

"U.S. Appl. No. 14/127,621, Response filed Dec. 1, 2016 to Non Final Office Action dated Sep. 2, 2016", 11 pgs.

"U.S. Appl. No. 14/433,815, Non Final Office Action dated Feb. 9, 2017", 36 pgs.

"U.S. Appl. No. 15/013,658, Notice of Allowance dated Jan. 26, 2017", 7 pgs.

"U.S. Appl. No. 15/013,658, Response filed Dec. 21, 2016 to Final Office Action dated Oct. 21, 2016", 14 pgs.

"European Application Serial No. 13850277.8, Response filed Feb. 28, 2017 to Extended European Search Report dated Aug. 2, 2016", 10 pgs.

"European Application Serial No. 13850951.8, Response filed Dec. 12, 2016 to Extended European Search Report dated May 25, 2016", 10 pgs.

"European Application Serial No. 13851603.4, Response filed Feb. 13, 2017 to Extended European Search Report dated Jul. 14, 2016", 15 pgs.

"European Application Serial No. 13851994.7, Response filed Jan. 11, 2017 to Extended European Search Report dated Jun. 28, 2016", 13 pgs.

"European Application Serial No. 13851996.2, Response filed Feb. 13, 2017 to Extended European Search Report dated Jul. 18, 2016", 8 pgs.

"European Application Serial No. 16163446.4, Response filed Feb. 23, 2017 to Office Action dated Aug. 29, 2016", 17 pgs.

"U.S. Appl. No. 14/119,228, Notice of Allowance dated Sep. 29, 2015", 8 pgs.

"U.S. Appl. No. 14/124,457, Notice of Allowance dated Feb. 8, 2016", 9 pgs.

"U.S. Appl. No. 14/124,457, Response filed Nov. 11, 2015 to Non Final Office Action dated Jul. 15, 2015", 11 pgs.

(56) References Cited

OTHER PUBLICATIONS

"U.S. Appl. No. 14/125,472, Non Final Office Action dated Jan. 22, 2016", 8 pgs.
"U.S. Appl. No. 14/125,472, Non Final Office Action dated Oct. 29, 2015", 11 pgs.
"U.S. Appl. No. 14/125,767, Notice of Allowance dated Dec. 24, 2015", 15 pgs.
"U.S. Appl. No. 14/125,767, PTO Response to Rule 312 Communication dated Feb. 9, 2016", 2 pgs.
"U.S. Appl. No. 14/126,654, Notice of Allowance dated Sep. 29, 2015", 21 pgs.
"U.S. Appl. No. 14/126,998, Non Final Office Action dated Sep. 25, 2015", 24 pgs.
"U.S. Appl. No. 14/126,998, Response filed Feb. 23, 2016 to Non Final Office Action dated Sep. 25, 2015", 11 pgs.
"U.S. Appl. No. 14/127,092, Examiner Interview Summary dated Oct. 9, 2015", 3 pgs.
"U.S. Appl. No. 14/127,092, Final Office Action dated Jan. 6, 2016", 25 pgs.
"U.S. Appl. No. 14/127,092, Response Non Final Office Action dated Jul. 6, 2015", 11 pgs.
"U.S. Appl. No. 14/127,621, Non Final Office Action dated Jan. 14, 2016", 19 pgs.
"U.S. Appl. No. 15/013,658, Preliminary Amendment filed Feb. 3, 2016", 9 pgs.
"Chinese Application Serial No. 201380051478.0, Preliminary Amendment filed Oct. 20, 2015", W/ English Claims, 18 pgs.
"Chinese Application Serial No. 201380051528.5, Voluntary Amendment dated Dec. 9, 2015", not in English, 13 pgs.
"Chinese Application Serial No. 201380051575.X, Voluntary Amendment dated Dec. 21, 2015", not in English, 13 pgs.
"Japanese Application Serial No. 2015-534837, Office Action dated Jan. 19, 2016", w/ English Translation, 5 pgs.
Kanzaki, Mitsuru, "Three-legged Ladder", Japanese Laid-open Utility Model Publication No. 7-32198, (Jun. 16, 1995), 21 pgs.
Nishina, Koichi, et al., "Stepladder", Japanese Laid-open Utility Model Publication No. 62-52700, (Apr. 1, 1987), 8 pgs.
Suzuki, Masaaki, et al., "Three-Leg Type Ladder", Patent Abstracts of Japan 09-112165, (Apr. 28, 1997), 8 pgs.
"U.S. Appl. No. 14/124,964, Respnse filed Jul. 8, 2016 to Non Final Office Action dated Apr. 8, 2016", 13 pgs.
"U.S. Appl. No. 14/125,472, Non Final Office Action dated Jun. 9, 2016", 10 pgs.
"U.S. Appl. No. 14/126,998, Final Office Action dated May 12, 2016", 24 pgs.
"U.S. Appl. No. 14/127,015, Non Final Office Action dated Jul. 18, 2016", 8 pgs.
"U.S. Appl. No. 14/127,015, Response filed Jun. 24, 2016 to Restriction Requirement dated Apr. 26, 2016", 8 pgs.
"U.S. Appl. No. 14/127,621, Final Office Action dated May 26, 2016", 25 pgs.
"U.S. Appl. No. 15/013,658, Non Final Office Action dated May 20, 2016", 50 pgs.
"CSI Collision Handling for CoMP", R1-123468, 3GPP TSG RAN WG1, (2012), 3 pgs.
"3rd Generation Partnership Project; Technical Specification Group Radio Access Network; Evolved Universal Terrestrial Radio Access (E-UTRA); Study on signalling and procedure for interference avoidance for in-device coexistence (Release 11)", 3GPP Standard; 3GPP TR 36.816, 3rd Generation Partnership Project (3GPP), Mobile Competence Centre ; 650, Route Des Lucioles ; F-06921 Sophia-Antipolis Cedex ; France, vol. RAN WG2, No. V11.2.0,, (Dec. 22, 2011), 1-44.
"3rd Generation Partnership Project;Technical Specification Group Radio Access Network;Further Advancements for E-UTRAPhysical Layer Aspects(Release 9)", 3GPP Draft; TR 36.814_200, 3rd Generation Partnership Project (3GPP), Mobile Competence Centre ; 650, Route Des Lucioles ; F-06921 Sophia-Antipolis Cedex; France, vol . RAN WG1, No. San Francisco, USA; Feb. 22, 2010, (Apr. 8, 2010).

"Aperiodic CSI Feedback for Rel-11 CoMP", 3GPP Draft; RI-123365 Aperiodic CSI Feedback for Rel-11 Comp, 3rd Generation Partnership Project, vol. RAN WG, Retrieved from the Internet: <URL:http://www.3gpp.org/ftp/tsg_ran/WGI_RL1/TSGR1_70/Docs/>, (Aug. 5, 2012).
"Device Trigger Information", 3gpp Draft; S2-120650, 3rd Generation Partnership Project (3GPP), Mobile Competence Centre ; 650, Route Des Lucioles ; F-06921 Sophia-Antipolis Cedex ; France, vol. Sa Wg2, No. Vancouver, (Jan. 31, 2012).
"European Application Serial No. 13850277.8, Extended European Search Report dated Aug. 2, 2016", 8 pgs.
"European Application Serial No. 13850323.0, Extended European Search Report dated Jul. 14, 2016", 12 pgs.
"European Application Serial No. 13850951.8, Extended European Search Report dated May 25, 2016", 9 pgs.
"European Application Serial No. 13851603.4, Extended European Search Report dated Jul. 14, 2016", 11 pgs.
"European Application Serial No. 13851994.7, Extended European Search Report dated Jun. 28, 2016", 10 pgs.
"European Application Serial No. 13851996.2, Extended European Search Report dated Jul. 18, 2016", 15 pgs.
"European Application Serial No. 16163446.4, Extended European Search Report dated Jul. 20, 2016", 11 pgs.
"Introduction of Rel-11 features", 3GPP Draft; RI-124012-36.213 CR0389 (Rel-11, B) Introduction of Rel-11 Features, 3rd Generation Partnership Project (3GPP), Retrieved from the Internet: <URL:http://www.3gpp.org/ftp/tsg_ran/WGI_RL1/TSGR1_70/Docs/>, (Sep. 19, 2012).
"Korean Application Serial No. 2015-7008322, Office Action dated Jul. 22, 2016", With English Translation, 15 pgs.
"Maximum number of CSI processes", 36PP Draft; RI-124290, 3rd Generation Partnership Project (36PP), Mobile Competence Centre,NEC Group, Retrieved from the Internet: <URL:http://www.3gpp.org/ftp/tsg_ran/WGI_RL1/TSGRI_70b/Docs>, (Sep. 29, 2012).
"MTC small data Identification mechanism for non-SMS Small Data Transmission Solution", 3gpp Draft: S2-114341_Mtc_Small_Data_Identification, 3rd Generation Partnership Project (3GPP), Mobile Competence Centre ; 650, Route Des Lucioles ; F-06921 Sophia-Antipolis Cedex ; France, (Oct. 4, 2011).
"Periodic CSI Feedback for Rel-11 CoMP", NTT DOCOMO, 3GPP Draft; RI-123364 Periodic CSI Feedback for Rel-11 CoMP, 3rd Generation Partnership Project (3GPP), Mobile Competence Centre, Retrieved from the Internet: <URL:http://www.3gpp.org/ftp/tsg_ran/WGI RL 1/TSGR1_70/Docs/>, (Aug. 5, 2012).
"Relay System Simulation Results with Coverage Boosting and Control Channel Modeling", 3GPP Draft; RI-094838—Relay SYS-SIM Results W Coverage Boosting and CCH Modeling---, 3rd Generation Partnership Project (3GPP), Mobile Competence Centre ; 650, Route Des Lucioles ; F-06921 Sophia-Antipolis Cedex ; France,, (Nov. 4, 2009).
"Remaining details of periodic CSI reporting", 3GPP Draft; RI-124723 Remaining Details of Periodic CSI Reporting, 3rd Generation Partnership Project (3GPP), Retrieved from the Internet: <URL:http://www.3gpp.org/ftp/tsg_ran/WGI_RL I/TSGRI_71/Docs>, (Nov. 2, 2012).
"Remaining Signaling Issues for the IDC operation", 3GPP Draft; R2-124472-Signaling, 3rd Generation Partnership Project (3GPP), Mobile Competence Centre ; 650, Route Des Lucioles ; F-06921 vol. RAN WG2, No. Bratislava, Slovakia; Oct. 8, 2012-Oct. 12, 2012, [Online] retrieved from the internet:http://www.3gpp.org/ftp/tsg ran/WG2 RL2/TSGR2 79bis/Docs/, (Sep. 28, 2012).
"Triggering procedure over Tsp", 3gpp Draft; S2-120558_Tsp_Trigger_Proc, 3rd Generation Partnership Project (3GPP), Mobile Competence Centre 650, Route Des Lucioles ; F-06921 Sophia-Antipolis Cedex France, vol. Sa Wg2, No. Vancouver, (Jan. 31, 2012).
"Update HSS based device trigger solution", 3GPP TSG SA WG2 Meeting #86: TD S2-113082, (Jul. 15, 2011), 5 pgs.
Huawei, et al., "Bandwidth reduction for low cost MTC UE and text proposal", 3GPP Draft; RI-120051, 3rd Generation Partnership Project (3GPP), Mobile Competence Centre ; 650, Route Des Lucioles ; F-06921 Sophia-Antipolis Cedex ; France, vol. RAN

(56) References Cited

OTHER PUBLICATIONS

WG1, No. Dresden, Germany; Feb. 6, 2012-Feb. 10, 2012, XP050562638, (Jan. 31, 2012), 7 pgs.
Huawei, et al., "Periodic CSI feedback collision handling for CoMP", 3GPP Draft; RI-123104, 3rd Generation Partnership Project (3GPP), Mobile Competence Centre, Retrieved from the Internet: <URL://http://www.3gpp.org/ftp/tsg_ran/WGI_RL1/TSGR1_70/Docs/>, (Aug. 5, 2012).
"Chinese Application Serial No. 201380051575.X, Response filed Jul. 20, 2017 to Office Action dated Apr. 1, 2017", w/ English Claims, 18 pgs.
"U.S. Appl. No. 14/126,998, Examiner Interview Summary dated Sep. 25, 2017", 4 pgs.
"U.S. Appl. No. 14/126,998, Response filed Oct. 10, 2017 to Final Office Action dated Jun. 22, 2017", 11 pgs.
"U.S. Appl. No. 14/127,621, Non Final Office Action dated Aug. 16, 2017", 34 pgs.
"U.S. Appl. No. 14/433,815, Notice of Allowance dated Aug. 14, 2017", 9 pgs.
"U.S. Appl. No. 14/126,998, Final Office Action dated Jun. 22, 2017", 30 pgs.
"U.S. Appl. No. 14/127,015, Non Final Office Action dated May 8, 2017", 11 pgs.
"U.S. Appl. No. 14/127,621, Advisory Action dated May 30, 2017", 2 pgs.
"U.S. Appl. No. 14/127,621, Response filed May 8, 2017 to Final Office Action dated Mar. 7, 2017", 10 pgs.
"U.S. Appl. No. 14/433,815, Examiner Interview Summary dated May 11, 2017", 3 pgs.
"U.S. Appl. No. 14/433,815, Response filed May 8, 2017 to Non Final Office Action dated Feb. 9, 2017", 13 pgs.
"Chinese Application Serial No. 201380051575.X, Office Action dated Apr. 1, 2017", w/ English Translation, 28 pgs.
"European Application Serial No. 13850951.8, Communication pursuant to Article 94(3) EPC dated Apr. 10, 2017", 5 pgs.
"European Application Serial No. 13851996.2, Response filed Apr. 4, 2017 to Extended European Search Report dated Jul. 18, 2016", 7 pgs.

* cited by examiner

METHOD AND APPARATUS FOR CONTROLLING SMALL DATA TRANSMISSION ON THE UPLINK

PRIORITY CLAIM

This application is a U.S. National Stage Filing under 35 U.S.C. 371 from International Patent Application Serial no. PCT/US2013/067522, filed Oct. 30, 2013, which claims priority to U.S. Provisional Patent Application No. 61/721, 436, filed on Nov. 1, 2012, the content of which applications is incorporated herein by reference in its entirety.

TECHNICAL FIELD

Embodiments described herein pertain generally to communications networks serving machine-type communications (MTC) devices and in particular to methods and apparatus for controlling uplink transmission of small data or low priority data in such networks.

BACKGROUND

Existing communications networks are increasingly integrating low-cost, low-power, low-capability machine-type communications devices to perform services independent of direct human interaction. MTC devices may transmit small amounts of data, and these transmissions may be of relatively low priority. However, because relatively large numbers of MTC devices may make such transmissions, and because MTC devices may transmit relatively frequently compared to other devices, these transmissions can place a significant burden on networks. Thus, there is a need to improve the efficiency with which MTC devices and other small-data transmission devices use uplink communication resources.

DETAILED DESCRIPTION

Recently, there has been an increase in the usage of MTC (Machine-type communications) devices. MTC refers to data communications between machines that do not necessarily need human interaction. The communications may occur over mobile networks. Current 3$^{rd}$ Generation Partnership Project (3GPP) standards for both Universal Mobile Telecommunications System (UMTS) and Long-term Evolution (LTE) support MTC, and other standards will likely support MTC.

Figure 1:
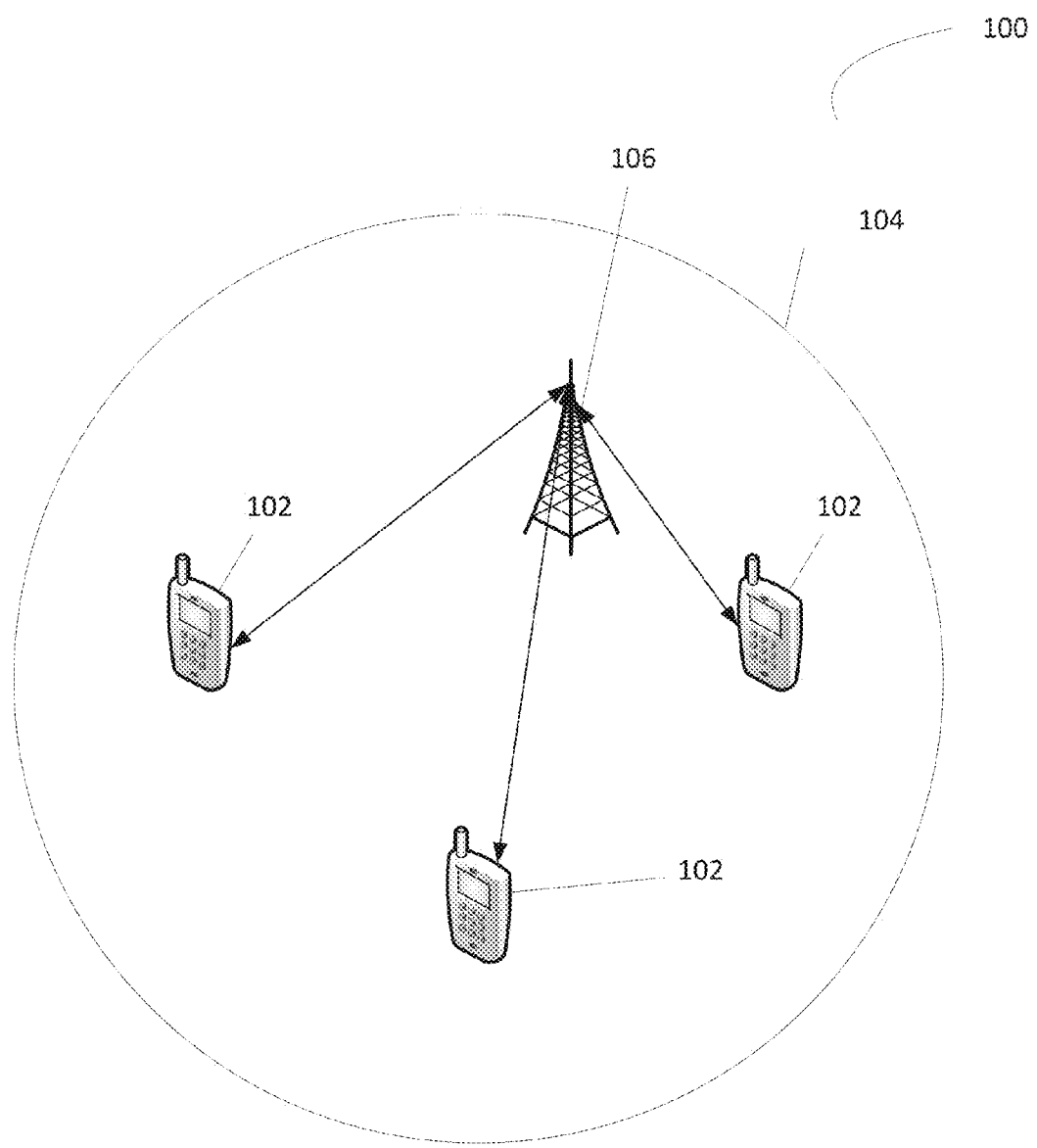
FIG. 1 is a schematic diagram illustrating a system in which some embodiments may be implemented.

FIG. 1 is a schematic diagram illustrating a system 100 in which some embodiments may be implemented. The system 100 can include one or more devices 102 within a geographical area 104 that is served by, for example evolved Node B (eNodeB) 106, although embodiments are not limited to communications through an eNodeB and may also comprise embodiments that communicate through a base station or other element. The devices 102 can be MTC devices. The devices 102 can communicate bidirectionally with the eNodeB 106. For example, the devices 102 can transmit on the uplink (UL) to the eNodeB 106 and receive on the downlink (DL) from the eNodeB 106.

The devices 102 may individually comprise any low-mobility, low-power, and/or low-functionality communications device. By non-limiting example, devices 102 can include a parking meter, security sensor, lock, garage door opener, a wireless access point, or any other MTC device. In additional examples, the devices 102 may comprise a mobile device, such as, but not limited to, a smartphone, cellular telephone, mobile phone, laptop computer, tablet computer, or other portable networked device. In addition, devices 102 may also be individually referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Current 3GPP UMTS and LTE/LTE-Advanced systems are designed to support high data rate applications and services. As such, these systems may not efficiently support small data transmissions. Some embodiments can provide more efficient support for small data transmissions by more efficient usage and allocations of UL resources.

Embodiments are described herein with respect to an LTE system operating in frequency division duplex (FDD) mode. However, other embodiments can be applicable to other radio access technologies and duplexing modes specified in 3GPP, i.e. UMTS FDD, UMTS TDD, LTE/LTE-Advanced FDD and LTE/LTE-Advanced TDD.

By way of non-limiting example, some embodiments are described herein with respect to a network 100 that comprises an LTE network based on the radio access technologies OFDMA/TDMA in the DL, SC-FDMA/TDMA in the uplink (UL), and operating in full-duplex FDD mode. Embodiments are described with respect to LTE frame structure type 1 that is applicable to FDD. However, embodiments are not limited thereto.

Some embodiments may use a hybrid automatic repeat request (HARQ) mechanism with N=8 HARQ processes, though embodiments are not limited thereto. A device 102 can obtain a set of Physical Resource Blocks (PRBs) to be used for UL transmission on the Physical Uplink Shared Channel (PUSCH) from a UL scheduling grant transmitted by eNodeB 106 using the Physical Downlink Control Channel (PDCCH) with Downlink Control Information (DCI) format 0 or another DCI format. Embodiments are described herein based on usage of DCI format 0 but embodiments are not limited thereto.

A device 102 can be configured with any number of MTC applications or other applications. Some applications can have a normal priority, while other applications may have a low priority. Low priority applications may be capable of tolerating longer transmission delays, and normal priority applications may also be capable of tolerating some transmission delay. A device 102 may use data radio bearers (DRBs) to exchange data with the eNodeB 106. In accordance with their Quality of Service (QoS) requirements or other requirements, normal priority applications may be mapped to a first DRB (e.g., DRB1) whereas the low priority applications may be mapped to a second DRB (e.g., DRB2). However, these DRB designations are examples for description purposes only, and embodiments are not limited thereto. A radio link control (RLC) sublayer can map DRB1, DRB2, or other DRBs to logical channels, for example DTCH1 and DTCH2. Logical channels can then be mapped on a medium access control (MAC) sublayer to the UL-SCH transport channel that is mapped in the physical layer to the PUSCH.

Transmission Time Restriction

Some embodiments provide flexibility for scheduling operations at the network for UL data transfer by applying transmission time restriction. For example, some embodiments use subframe pattern restriction to restrict UL transmissions in accordance with the expected or actual traffic pattern for the devices 102 that are in a connected mode (i.e., when a radio resource control (RRC) connection has been established between the device 102 and the eNodeB 106). In some embodiments, signaling overhead in UL and DL may be reduced because a device 102 may refrain from sending Scheduling Requests (SR) for UL subframes for which data transmissions are not allowed.

Correspondingly, the eNodeB 106 may conserve DL resources, in particular DL control channel resources, because the eNodeB 106 may not send UL scheduling grants for UL subframes for which data transmissions are not allowed. Further, the eNodeB 106 can control the use of PUSCH resources to perform time-domain multiplexing of devices 102 for data transmission taking into account the different traffic patterns observed in the devices 102.

Based on the expected or actual traffic pattern the eNodeB 106 may configure a device 102 in connected mode with transmission time restriction configuration(s) for each DRB established in the device 102 using the RRC connection reconfiguration message.

In some embodiments, a transmission time restriction configuration can be given by a pattern configuration including a bitmap in which each bit set to "1" corresponds to a subframe for which UL transmissions are permitted for the corresponding DRB. Otherwise, UL transmissions are not allowed for the corresponding subframe for that DRB. Table 1 is an illustrative example of a signaling format including information elements (IE) for transmission time restriction. One or more subframe pattern configurations of different lengths may be configured for each established DRB.

TABLE 1

Signaling format of IEs for transmission time restriction

| IE | Type | Description |
| --- | --- | --- |
| DRB identity | INTEGER (1 ... 32) | The DRB to which the transmission time restriction applies |
| Logical Channel identity | INTEGER (3 ... 10) | The logical channel to which the transmission time restriction applies |
| Transmission time restriction | | Includes one or more pattern configurations |
| Pattern configuration 1 | Bitstring (8) | Bit 0 corresponds to subframe #0, bit 1 corresponds to subframe #1, . . . Data transmission is only allowed in those subframes for which the bit is set to "1". Is activated by default if more than one pattern configuration is signalled. |

TABLE 1-continued

Signaling format of IEs for transmission time restriction

| IE | Type | Description |
| --- | --- | --- |
| Pattern configuration 2 | Bitstring (16) | Bit 0 corresponds to subframe #0, bit 1 corresponds to subframe #1, . . . Data transmission is only allowed in those subframes for which the bit is set to "1". |
| ... | | |
| Pattern configuration N | Bitstring (N*8) | Bit 0 corresponds to subframe #0, bit 1 corresponds to subframe #1, . . . Data transmission is only allowed in those subframes for which the bit is set to "1". |

The eNodeB 106 may set the bitmap in each transmission time restriction configuration in accordance with the observed traffic pattern for the respective DRB/logical channel in the UL. Further, a device 102 can use each configured subframe pattern configuration periodically, i.e., the subframe pattern configuration may be repeated in accordance with the periodicity of the pattern length.

Transmission time restriction can be activated and deactivated on, for example, the PHY sublayer or on the MAC sublayer.

In embodiments for which activation and deactivation occur on the PHY sublayer, the eNodeB 106 can set fields using an extended PDCCH DCI format 0, to dynamically activate or deactivate transmission time restriction. A non-limiting example with three added fields is shown in Table 2, however other fields may be used:

TABLE 2

DCI format 0 fields for subframe pattern restriction

| Length | Name | Description |
| --- | --- | --- |
| 4 bits | Logical channel identity | The logical channel to which the transmission time restriction command applies |
| 1 bit | Subframe pattern restriction state | Value = 0 to indicate that transmission time restriction is to be deactivated; Value = 1 to indicate that transmission time restriction is to be activated |
| N bits | Subframe pattern configuration index | The index of the subframe pattern configuration or configurations as configured on the RRC sublayer |

In embodiments for which activation and deactivation of transmission time restriction occur on the MAC sublayer, the eNodeB 106 uses a MAC Control Element to dynamically activate or deactivate the subframe pattern configuration(s) as configured on the RRC sublayer, on the MAC sublayer. A non-limiting example of a MAC subheader and a MAC control element for dynamic activation and deactivation of transmission time restriction are shown in Tables 3 and 4:

TABLE 3

MAC subheader for transmission time restriction activation/deactivation

| Length | Name | Description |
| --- | --- | --- |
| 1 bit | R | Reserved |
| 1 bit | R | Reserved |

TABLE 3-continued

MAC subheader for transmission time restriction activation/deactivation

| Length | Name | Description |
|---|---|---|
| 1 bit | E | Indicates if more fields are present in the MAC header or not. Value = 1 to indicate another set of R/R/E/LCID fields. Value = 0 to indicate that either MAC SDU, a MAC control element or padding starts at the next byte |
| 5 bits | LCID | Logical channel identity indicating the logical channel to which the transmission time restriction command shall apply |

TABLE 4

MAC control element for transmission time restriction activation/deactivation

| Length | Name | Description |
|---|---|---|
| 1 bit | R | Reserved |
| 1 bit | R | Reserved |
| 1 bit | S | Value = 0 to indicate that transmission time restriction is to be deactivated; Value = 1 to indicate that transmission time restriction is to be activated |
| 5 bits | index | Subframe pattern configuration index, indicating the index of the subframe pattern configuration/s as configured on RRC sublayer |

The eNodeB 106 can transmit the MAC Control Element and its corresponding MAC subheader, described above with respect to Tables 3 and 4, as part of the MAC protocol data unit (PDU) header of a MAC PDU in DL on DL-SCH/PDSCH.

The device 102 may refrain from sending Scheduling Requests (SR) for UL subframes for which data transmissions are not allowed and no PUCCH (Physical Uplink Control Channel) resource for SR transmission is available. Correspondingly, the eNodeB 106 can refrain from sending UL scheduling grants on the PDCCH for UL subframes for which data transmissions are not allowed.

Transmission Time Restriction Examples

Embodiments may restrict transmission times semi-statically or dynamically. Examples of semi-static and dynamic transmission time restriction are discussed with respect to FIGS. 2 and 3.

Figure 2:
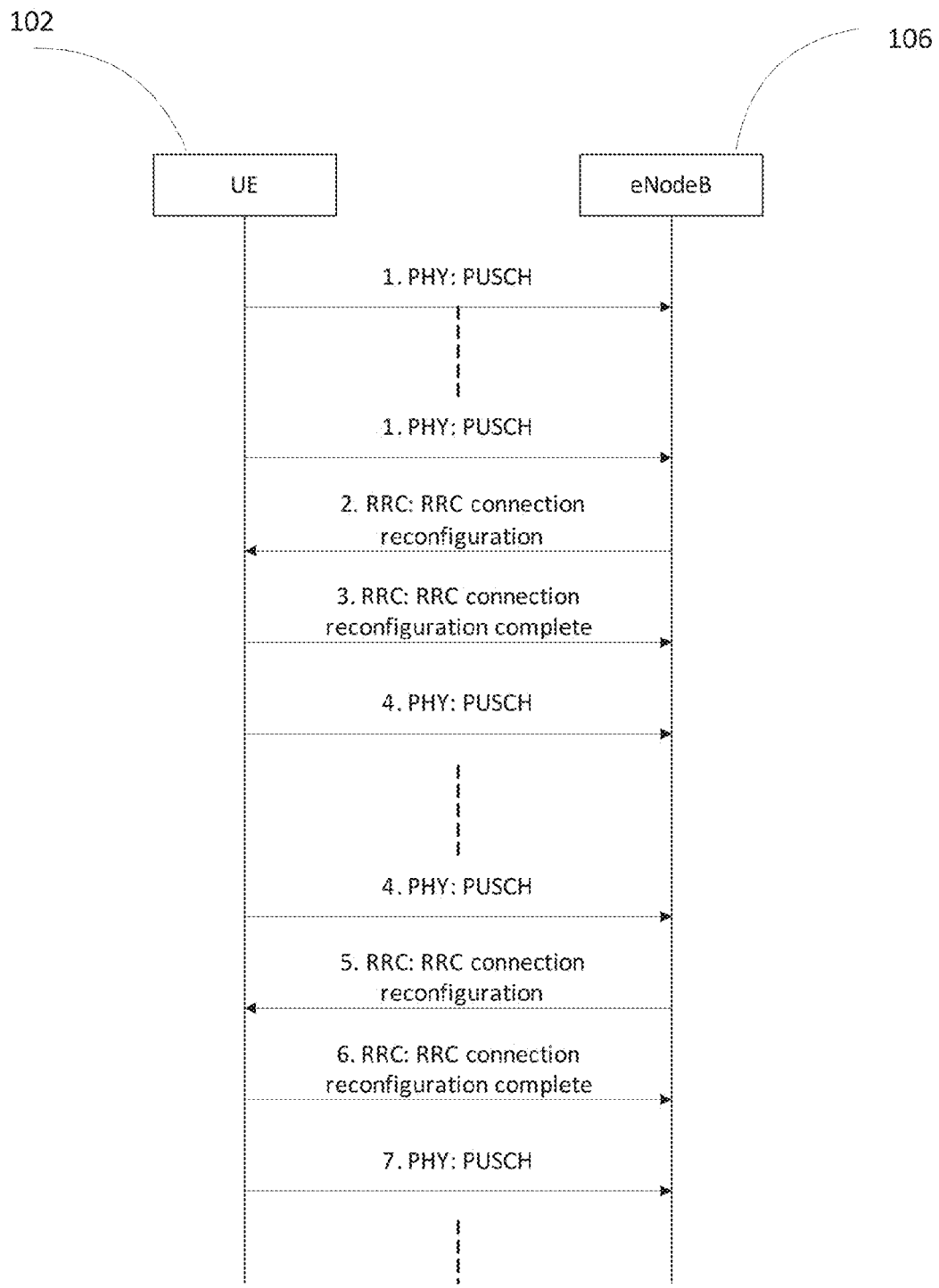
FIG. 2 is a signal flow diagram illustrating semi-static transmission time restriction in accordance with some embodiments.

FIG. 2 is a signal flow diagram illustrating semi-static transmission time restriction in accordance with some embodiments. The device 102 is assumed to be in RRC_CONNECTED mode with normal priority and low priority DRBs DRB1 and DRB2 and logical channels configured as described above. At signal 1, transmission time restriction has yet to be configured and the device 102 transmits UL data on the PUSCH when any UL data for the logical channels (e.g., data traffic channels DTCH1 and DTCH2) becomes available for transmission. One or more of the logical channels, for example one or more of DTCH1 and DTCH2, may have been assigned for use by MTC applications.

At signal 2, the eNodeB 106 may have observed, for at least a time period, that the device 102 is transmitting a relatively small amount of UL data (e.g. few hundred bytes) on a logical channel and DRB (e.g., DTCH2/DRB2) to which low priority MTC applications have been mapped. Based on this observation, the eNodeB 106 can determine that the device 102 is, for example, a MTC UE, and that the transmission is for a low-priority application. The eNodeB 106 may configure transmission time restriction for UL data transmissions on a logical channel and DRB, for example DTCH2/DRB2, in accordance with the observed traffic pattern. The eNodeB 106 can perform this configuration by transmitting, for example, a radio resource control (RRC) signal with IEs as described above.

The device 102 therefore receives transmission time restriction information, in the RRC signal from the eNodeB 106, in accordance with a standard of the 3GPP family of standards. The signal indicates time periods during which the device 102 is permitted to transmit data on the logical UL channel. Example transmission time restriction information may be similar to that shown below in Table 5 (Table 5 in turn is an illustrative example of IEs shown in Table 1):

TABLE 5

Example transmission time restriction IEs

| IE | IE Type | Description |
|---|---|---|
| DRB identity | 2 | Identifier for the DRB for which transmission time restriction is applied |
| Logical Channel Identity | 2 | Identifier of logical channel for which transmission time restriction is applied |
| Transmission time restriction Pattern configuration 1 | One or more bitstrings Bitstring (16) | Can include one or more pattern configurations (1000000010000000) data transmission is only allowed in those subframes for which the bit is set to "1". |

In the example of Table 5, the eNodeB 106 has configured one subframe pattern configuration of length 16 bits. The subframe pattern configuration 1 is signaled to the device 102 using the RRC connection reconfiguration message with IEs to identify a Data Radio Bearer (DRB) and the logical UL channel for which the transmission time restriction applies, and a transmission time restriction IE, for example a transmission time restriction configuration that identifies time periods, e.g., particular subframes, for which the device 102 can transmit on the UL.

The transmission time restriction IE includes a subframe restriction bitmap for indicating subframes for which the UE is permitted to transmit on the specified logical UL channel. The transmission time restriction IE can include a plurality of subframe restriction bitmaps, as will be described below with respect to FIG. 3. The UL data transmissions on other logical channels or DRBs, for example normal priority DTCH1/DRB1, are not affected by the subframe pattern configuration of Table 5.

In signal 3, the device 102 transmits an RRC connection reconfiguration complete message. With the transmission of this message, the device 102 activates the received subframe pattern configuration 1 of length 16 bits.

In signal 4, the device 102 refrains from transmitting additional data in a time period on the specified logical UL channel based on the transmission time restriction specified in the RRC signal IEs as follows: the device 102 transmits UL data in any subframe for those logical channels not specified as being restricted in the RRC signal IEs. For example, the device 102 can transmit data for applications with a normal priority level on logical channels not specified as being restricted. However, embodiments are not limited thereto, and the device 102 may transmit any data of any priority level on logical channels not subject to transmission time restriction.

In contrast, the device 102 transmits UL data for the logical channel to which transmission time restriction applies in accordance with the subframe pattern configuration 1, i.e., in at most those subframes on which UL transmissions are allowed. For example, the device 102 may transmit data for applications with a low priority level on logical channels to which transmission time restriction applies. However, embodiments are not limited thereto, and the device 102 may refrain from transmitting data of any priority level on logical channels subject to transmission time restriction.

In signal 5, based on further observation of the traffic pattern for UL data on low-priority logical channels/DRBs (e.g., DTCH2/DRB2), the eNodeB 106 reconfigures transmission time restriction for UL data transmissions on DTCH2/DRB2 in accordance with the newly observed traffic pattern. For instance, the eNodeB 106 can reconfigure the subframe pattern configuration 1 from 16 bits to 32 bits. The UL data transmissions on other channels or DRBs, for example normal-priority DTCH1/DRB1, are not affected by the revised subframe pattern configuration.

In signal 6, the device 102 responds to the RRC connection reconfiguration complete message. With the transmission of the complete message the UE activates the received revised subframe pattern configuration.

In signal 7, the device 102 may send UL data on the PUSCH as follows: UL data for the logical channel DTCH1, or other logical channels for which transmission time restriction has not been configured or activated, is sent in any subframe because DTCH1 is unaffected by the revised subframe pattern configuration. In contrast, the device 102 may transmit UL data for the logical channel DTCH2 in accordance with the revised subframe pattern configuration 1, i.e., in at most those subframes on which UL transmissions are allowed.

Figure 3:
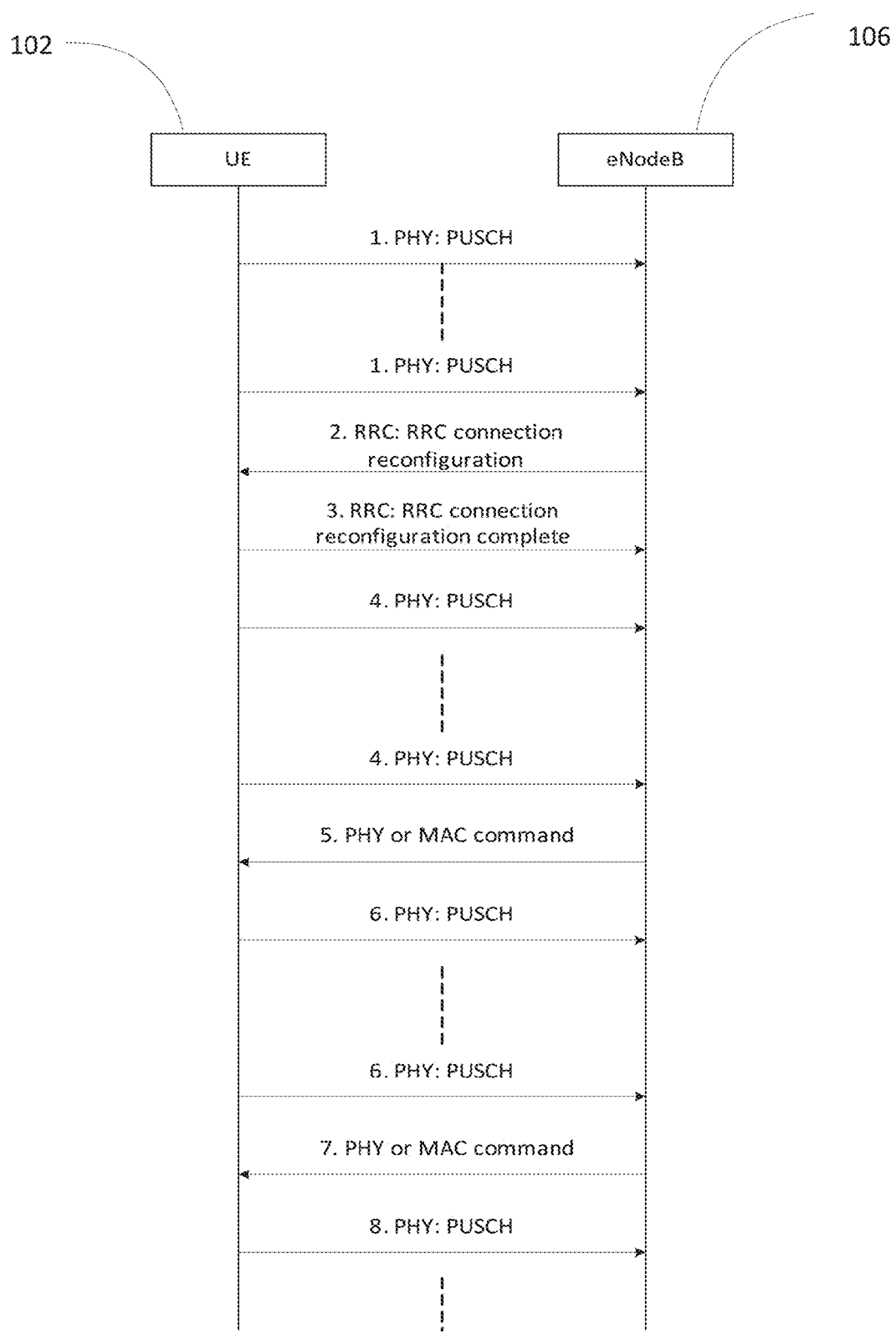
FIG. 3 is a signal flow diagram illustrating dynamic transmission time restriction in accordance with some embodiments.

FIG. 3 is a signal flow diagram illustrating dynamic transmission time restriction in accordance with some embodiments. Dynamic transmission time restriction may allow the eNodeB 106 to perform a flexible scheduling scheme to adapt UL data transfer in accordance with the observed traffic pattern. The device 102 is assumed to be in RRC_CONNECTED mode with normal priority and low priority DRBs DRB1 and DRB2 and logical channels configured as described above.

At signal 1, transmission time restriction has yet to be configured, and the device 102 transmits UL data on PUSCH when any UL data for the logical channels (e.g., data traffic channels DTCH1 and DTCH2) becomes available for transmission. One or more of the logical channels, for example one or more of DTCH1 and DTCH2, may have been assigned for use by MTC applications.

At signal 2, the eNodeB 106 may have observed, for at least a time period, that the device 102 is transmitting a relatively small amount of UL data (e.g. few hundred bytes) on DTCH2/DRB2 to which low priority MTC applications have been mapped. Based on this observation, the eNodeB 106 may configure transmission time restriction for UL data transmissions on a certain logical channel and DRB, for example DTCH2/DRB2, in accordance with the observed traffic pattern.

The eNodeB 106 may configure a plurality of subframe pattern configurations. As an illustrative example, the eNodeB 106 may configure three subframe pattern configurations as shown in Table 6 below. The eNodeB 106 can signal subframe pattern configurations to device 102 UE using the RRC connection reconfiguration message with IEs as described above. The UL data transmissions on other logical channels and DRBs that are not specified in RRC IEs as being restricted are not affected by the subframe pattern configurations.

TABLE 6

Example transmission time restriction IEs

| Information element | Type | Description |
| --- | --- | --- |
| DRB identity | 2 | Identifier for the DRB for which transmission time restriction is applied |
| Logical Channel Identity | 2 | Identifier of logical channel for which transmission time restriction is applied |
| Transmission time restriction Pattern configuration 1 | Bitstring (16) | (1000000010000000); data transmission is only allowed in those subframes for which the bit is set to "1". Is activated by default if more than one pattern configuration is signalled. |
| Pattern configuration 2 | Bitstring (32) | (10000000000000001000000000000000); data transmission is only allowed in those subframes |
| Pattern configuration 3 | Bitstring (48) | (100000000000000010000000000000001000000000000000); data transmission is only allowed in those subframes |

In signal 3, the device 102 transmits an RRC connection reconfiguration complete message. With the transmission of this message the device 102 activates the received subframe pattern configuration 1 of length 16 bits.

In signal 4, the device 102 refrains from transmitting additional data in a time period on the specified logical UL channel based on the transmission time restriction specified in the RRC signal IEs as follows: the device 102 transmits UL data in any subframe for those logical channels not specified as being restricted in the RRC signal IEs. For example, the device 102 can transmit data for applications with a normal priority level on logical channels not specified as being restricted. However, embodiments are not limited thereto, and the device 102 may transmit any data of any priority level on logical channels not subject to transmission time restriction.

In contrast, the device 102 transmits UL data for the logical channel to which transmission time restriction applies in accordance with the subframe pattern configuration 1, i.e., in at most those subframes on which UL transmissions are allowed. However, embodiments are not limited thereto, and the device 102 may refrain from transmitting data of any priority level on logical channels subject to transmission time restriction.

In signal 5, based on further observation of the traffic pattern for UL data on low-priority logical channels/DRBs (e.g., DTCH2/DRB2), the eNodeB 106 reconfigures transmission time restriction for UL data transmissions on DTCH2/DRB2 in accordance with the newly observed traffic pattern. For example, the eNodeB 106 may activate subframe pattern configuration 2 (of length 32 bits) for UL data transmissions on DTCH2/DRB2 in accordance with the newly observed traffic pattern.

In some embodiments, the eNodeB 106 transmits a corresponding command on PHY using the extended PDCCH DCI format 0. The command may be similar to that discussed above with respect to Table 2. In other embodiments, the eNodeB 106 transmits a corresponding command on MAC using a MAC Control Element. This command may be similar to that discussed above with respect to Tables 3 and 4. The eNodeB 106 may set fields to select the corresponding logical channel to which transmission time restriction is to be applied. The eNodeB 106 may set a subframe pattern restriction state to, e.g., 1 or other predefined value, to activate subframe pattern restriction.

The eNodeB 106 may set a subframe pattern configuration index to a value, for example an index value, to select the desired subframe pattern configuration from among a plurality of subframe pattern configurations. The device 102 can receive this index value, in the PDCCH DCI format 0 or in MAC Control Element, indicating which of the plurality of subframe restriction bitmaps to use for determining the subframes for which the device 102 should refrain from transmitting in the UL.

In signal 6, the device 102 may send UL data on the PUSCH as follows: UL data for the logical channel DTCH1, or other logical channels for which transmission time restriction has not been configured or activated, is sent in any subframe because DTCH1 is unaffected by the subframe pattern configuration. In contrast, the device 102 may transmit UL data for the logical channel DTCH2 in accordance with the subframe pattern configuration 2, i.e., in those subframes on which UL transmissions are allowed.

In signal 7, based on further observation of the traffic pattern for UL data on DTCH2/DRB2, the eNodeB 106 reconfigures transmission time restriction for UL data transmissions on DTCH2/DRB2 in accordance with the newly observed traffic pattern. For example, the eNodeB 106 may activate subframe pattern configuration 3 (of length 48 bits) for UL data transmissions on DTCH2/DRB2 in accordance with the newly observed traffic pattern. In some embodiments, as described above, the eNodeB 106 may set fields to select the corresponding logical channel to which transmission time restriction is to be applied. The eNodeB 106 may set a subframe pattern restriction state to, e.g., 1 or other predefined value, to activate subframe pattern restriction. The eNodeB 106 may set a subframe pattern configuration index to an index value, to select the desired subframe pattern configuration from among a plurality of subframe pattern configurations In signal 8, the device 102 may send UL data on the PUSCH as follows: UL data for the logical channel DTCH1, or other logical channels for which transmission time restriction has not been configured or activated, is sent in any subframe because DTCH1 is unaffected by the subframe pattern configuration. In contrast, the device 102 may transmit UL data for the logical channel DTCH2 are sent in accordance with the subframe pattern configuration 3, i.e., in those subframes on which UL transmissions are allowed.

Scheduling Request Restriction

Instead of or in addition to transmission time restriction embodiments discussed above, some embodiments may allow for signaling of a willingness or ability to tolerate delays on at least some logical channels to further reduce signaling overhead in a system 100. For example, transmission time restriction, described above, can be applied to one logical channel mapped to low priority MTC applications, while delay tolerance signaling, described below, may be applied to another logical channel mapped to low priority MTC applications. However, embodiments are not limited to implementation on low priority logical channels, or to any particular combination of delay tolerance signaling and transmission time restriction implementations.

Some current systems supporting 3GPP UMTS and LTE/LTE-Advanced Release 10 or later may use a delay-tolerant indication and extended wait timer to protect the core network from signaling congestion and overload due to MTC. When a device 102 (FIG. 1) supporting 3GPP UMTS and LTE/LTE-Advanced Release 10 or later is configured for delay tolerant access, the device 102 may send a delay tolerant indicator to, for example, the eNodeB 106 as establishment cause in an RRC Connection Request message. However, because most MTC applications may be more delay-tolerant relative to human-to-human applications, some embodiments may provide further optimizations at different layers to reduce signaling load in, for example, the Radio Access Network (RAN). Some embodiments may also aid in decreasing device 102 power consumption, which may be relatively more important for MTC devices 102 than for other types of devices 102 that receive human interaction.

As described previously, an eNodeB 106, base transceiver station, or other network-side element may use dynamic or semi-persistent scheduling to allocate resources in the time and frequency domain for the devices 102 to transmit UL data. Devices 102 can request these resources with SRs.

In some embodiments, a device 102 can conserve power and reduce the signaling overhead over the air interface by adjusting the transmission of SRs based on certain parameters (e.g. timer, buffer size). In some embodiments, the current eNodeB 106 dynamic scheduling method may be adapted for certain types of UL data or devices 102, for example, for devices 102 or data that can be categorized as small data (SD) and delay tolerant. However, embodiments are not limited to SD applications or devices 102, or to delay tolerant applications or devices 102. In some embodiments device 102 power consumption, caused by the transmitting of multiple control messages for sending a small amount of data on the UL, may be reduced by waiting until sufficient data is collected before sending SRs for UL resources.

Embodiments may define at least two new parameters. A first parameter indicates the maximum time that the data associated with a given logical channel would be buffered before sending an SR. For purposes of discussion, this parameter may include an IE SRDelayTimer, as part of the 3GPP LogicalChannelConfig IE, although embodiments are not limited thereto. Another parameter can indicate the maximum size of the data that could be accumulated in the buffer before sending the SR. For purposes of discussion, this parameter may include a derived parameter SmallDataBucketSize, although embodiments are not limited thereto.

In accordance with the current scheduling request procedures, a device 102 may transmit an initial SR if new data arrives in a logical channel and the device 102 has no UL-SCH resource to transmit the data in a transmission time interval (TTI). In current systems, the device 102 may repeat the same or similar SR transmission in future TTIs in which SR transmission is possible on, for example, a UE-specific PUCCH resource for SR transmission.

In some embodiments, SR signaling is reduced when the device 102 refrains from transmitting SRs, and buffers any UL data, until at least one of the following conditions are fulfilled:

(A) A wait time (e.g., SRDelayTimer) is reached;
(B) A minimum data size (e.g., SmallDataBucketSize) is reached; or
(C) Priority data (e.g., delay-sensitive data) is detected by the device 102 for transmission on the UL.

SRDelayTimer and SmallDataBucketSize may include or be defined as thresholds with values set at upper layers for a device 102. Alternatively or in addition, SRDelayTimer and SmallDataBucketSize can be decided by the network. In addition, these thresholds might be configured per device 102 or per logical channel or per Logical Channel Group (LCG) or based on the type of applications running on the device 102.

As currently defined in some versions or releases of 3GPP T536.331 section 6.3.2 which defines radio resource control information elements, the LogicalChannelConfig IE contains the prioritisedBitRate (PBR) and BucketSizeDuration (BSD) parameters. The LogicalChannelConfig IE can also configure SRDelayTimer in some embodiments to have delay values, for example 1000 ms or any other delay value. SmallDataBucketSize can be derived from the parameters PBR, BSD, and SRDelayTimer according to the calculation SmallDataBucketSize=PBR×BSD×SRDelayTimer, to signify a small data bucket size of the corresponding logical channel. Alternatively, SmallDataBucketSize can be derived from the parameters PBR, BSD according to the calculation SmallDataBucketSize=PBR×BSD. However, a determination of SmallDataBucketSize is not limited to any particular calculation or formula. SmallDataBucketSize can map to one logical channel or to multiple logical channels based on small data availability in one or more logical channels, according to a particular network configuration.

If higher priority data is available, the device 102 transmits the SR as needed. The device 102 may transmit other small data using allocated resources such that the small data can "piggyback" on the higher priority data if permitted or possible using the allocated UL grant.

The device 102 may determine whether to transmit UL SR to request resources for transmitting application data, based on current values for SRDelayTimer and SmallDataBucketSize (or any other parameters) and on the threshold information for these or other parameters. Further, the device 102 may use delaying of the SR for specific kinds of traffic, rather than for all UL data that is generated. For example, in case of device 102 with delay tolerant and delay sensitive applications running simultaneously or device 102 with different QoS traffic characteristics, procedures according to some embodiments might only apply to delay tolerant traffic or to data with specific QoS characteristics.

SRDelayTimer and SmallDataBucketSize may be undefined by default or set to zero so that delay procedures described with respect to some embodiments are not implemented or do not apply any delay to UL SRs. SRDelayTimer and SmallDataBucketSize may be assigned or allocated different values for different applications, logical channels, or logical channel groups (LCG).

The device 102 may use SRDelayTimer and SmallDataBucketSize according to one or more of the pseudo code segments below, although example embodiments are not limited thereto. As shown in the pseudo code segment of Table 7, for a given logical channel, if new UL data corresponding to low priority and delay tolerant application traffic or data with specific Quality of Service (QoS) requirements is available for transmission, the device 102 will check if the SRDelayTimer is running. If there is data and the timer is still running, the device 102 buffers the data until the timer expires at which point the device 102 transmits the SR.

TABLE 7

Delay SR based on SRDelayTimer

| | |
|---|---|
| 1: | When new data enters the buffer queue |
| 2: | If SRDelayTimer is running |

TABLE 7-continued

Delay SR based on SRDelayTimer

| | |
|---|---|
| 3: | Store the data in the buffer |
| 4: | Else |
| 5: | Start the SRDelayTimer |
| 6: | When SRDelayTimer expires |
| 7: | Send the SR to request the UL grant for the data stored in the buffer |

As shown in the pseudo code segment of Table 8, for a given logical channel, if new UL data corresponding to low priority and delay tolerant application traffic or data with specific QoS is available for transmission, the device 102 will check if the SRDelayTimer is running. If there is data and the SRDelayTimer is still running, the device 102 will also check if the total data accumulated in the buffer exceeds the SmallDataBucketSize threshold, in which case, the device 102 stops the timer and transmits the SR. Otherwise, the device 102 continues to buffer the data until the SRDelayTimer expires, at which point the device 102 transmits the SR.

TABLE 8

Delay SR based on SRDelayTimer and SmallDataBucketSize

| | |
|---|---|
| 1: | When new data enters the buffer queue |
| 2: | If SRDelayTimer is running |
| 3: | If total buffer size is greater than SmallDataBucketSize threshold |
| 4: | Send the SR to request the UL grant for the data stored in the buffer |
| 5: | Stop and reset SRDelayTimer |
| 6: | Else |
| 7: | Star the SRDelayTimer |
| 8: | When SRDelayTimer expires |
| 9: | Send the SR to request the UL grant for the data stored in the buffer |

As shown in the pseudo code segment of Table 9, when new data is generated, the device 102 may choose the minimum threshold among multiple defined values, for example the minimum threshold among values defined per application, per logical channel, etc., to use for deciding whether to transmit an SR. If any of the defined values for SRDelayTimer and SmallDataBucketSize is zero, or not present, it is assumed the corresponding minimum value is zero and the device 102 will immediately transmit an SR.

TABLE 9

Delay SR based on SRDelayTimer and SmallDataBucketSize

| | |
|---|---|
| 1: | When new data is generated |
| 2: | Update SRDelayTimer with the minimum of different values |
| 3: | If SRDelayTimer is running |
| 4: | If total buffer size is greater than SmallDataBucketSize threshold (or minimum threshold if different values are configured) |
| 5: | Send the SR to request the UL grant for the data stored in the buffer |
| 6: | Stop and reset SRDelayTimer |
| 7: | Else |
| 8: | Start the SRDelayTimer |
| 9: | When SRDelayTimer expires |
| 10: | Send the SR to request the UL grant for the data stored in the buffer |

Example Device for Implementing Embodiments

Figure 4:
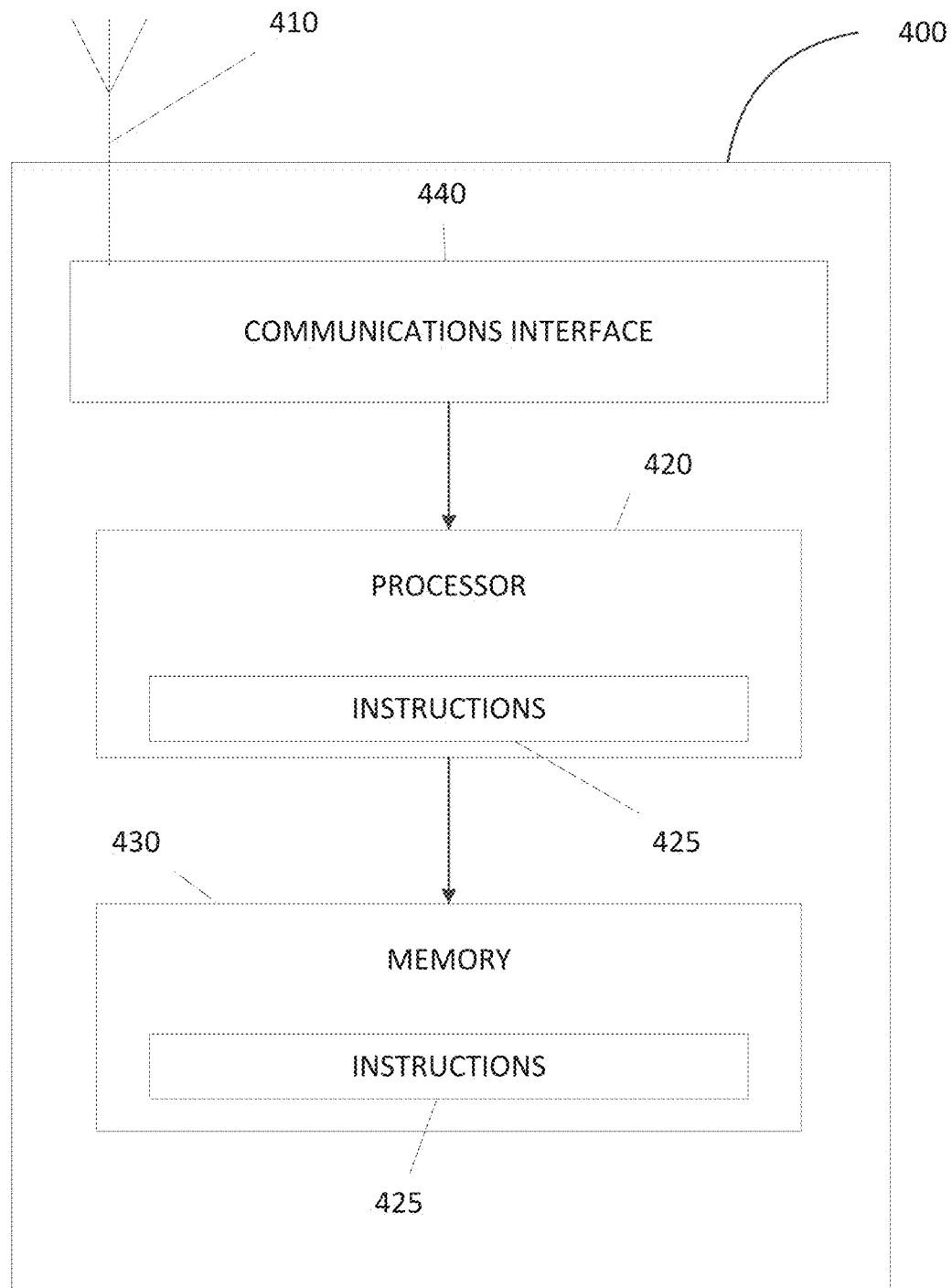
FIG. 4 is a block diagram of the basic components of user equipment in accordance with some embodiments.

FIG. 4 is a block diagram of the basic components of a UE 400 in accordance with some embodiments. The UE 400 may be suitable as a device 102 (FIG. 1). The UE 400 may support methods for small data transmission, in accordance with embodiments described above with respect to FIG. 1-3 and Tables 1-9.

The UE 400 includes one or more antennas 410 arranged to communicate with a base station (BS), the eNodeB 106 (FIG. 1), or other types of wireless local area network (WLAN) access points. The UE 400 further includes a processor 420, instructions 425, and a memory 430. The UE 400 may further include a communications interface 440. In one embodiment, the memory 430 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

Example embodiments allow a UE 400 to refrain from transmitting small data or other data in certain periods on the UL, and to refrain from requesting UL resources under certain conditions as described above with respect to FIG. 2-3 and Tables 1-9. In at least one embodiment, the communications interface 440 is, for example, a wireless physical layer which operates according to a multiple input/multiple output (MIMO) operation. As described above with respect to FIG. 2-3, the UE 400 may transmit first data on a logical UL channel. The logical UL channel having been assigned for use by machine-type communications (MTC) applications.

The communications interface 440 may receive transmission time restriction information, responsive to the transmitting, that indicates time periods during which the UE is permitted to transmit additional data on the logical UL channel. The transmission time restriction information can be received in a radio resource control (RRC) signal from an evolved Node B (eNodeB) in accordance with a standard of the 3GPP family of standards, although example embodiments are not limited thereto. As discussed above with respect to Table 1, the RRC signal can include an information element (IE) to identify a Data Radio Bearer (DRB) and the logical UL channel for which the transmission time restriction applies.

The signal includes a transmission time restriction IE. The transmission time restriction IE can include one or more subframe restriction bitmaps for indicating subframes for which the UE is permitted to transmit on the logical UL channel. At least when the transmission time restriction IE includes a plurality of subframe restriction bitmaps, the UE 400 may receive an index value, in physical downlink control channel (PDCCH) downlink control information (DCI), indicating which of the plurality of subframe restriction bitmaps to use for the refraining. Alternatively, or in addition, at least when the transmission time restriction IE includes a plurality of subframe restriction bitmaps, the UE 400 may receive an index value, in a medium access control (MAC) control element indicating which of the plurality of subframe restriction bitmaps to use for the refraining. The PDCCH DCI and MAC are described in more detail above with respect to Tables 2-4.

The UE 400 may refrain from transmitting additional data in a time period on the logical UL channel based on the transmission time restriction information.

The UE 400 can store, for example in memory 430, application data to be transmitted on an UL resource. The processor 420 can determine whether to transmit an UL scheduling request (SR) to request resources for transmitting the buffered data, based on a value of a delay parameter. Some delay parameters can include SRDelayTimer or SmallDataBucketSize, discussed above, although example embodiments are not limited thereto. The processor 420 may refrain, or cause the communications interface 440 to refrain, from transmitting the UL SR if the value of the delay parameter is below a threshold. Threshold information for the delay parameter can be based on an identity of the corresponding UL logical channel, on a type of an application for which the data is to be transmitted, or on an identity of the UE, or on any combination thereof. The threshold information is included in a logical channel configuration information element (IE) transmitted in accordance with a standard of the 3GPP family of standards.

The processor 420 may apply the transmission time restriction data for determining whether to refrain from transmitting on a first UL logical channel, while the processor 420 may apply the delay parameter for determining whether to refrain from transmitting the UL SR on another logical UL channel different from the first logical UL channel. However, as described above, embodiments are not limited to any particular combination of transmission time restriction and SR transmission delay on different logical channels.

The processor 420 may include logic or code to enable the UE 400 to process signals received from the network through the antenna 410. The processor 420 may include code or other instructions 425 to allow the UE 400 to refrain from transmitting small data or other data in certain periods on the UL, and to refrain from requesting UL resources under certain conditions as described above with respect to FIG. 2-3 and Tables 1-9. The instructions 425 may further allow the UE 400 transmit first data on a logical UL channel, the logical UL channel having been assigned for use by machine-type communications (MTC) applications. The instructions 425 may further allow the UE 400 to receive transmission time restriction information, responsive to the transmitting, that indicates time periods during which the UE is permitted to transmit additional data on the logical UL channel. The instructions 425 may further allow the UE 400 to refrain from transmitting additional data in a time period on the logical UL channel based on the transmission time restriction information. The instructions 425 may additionally or alternatively reside in the memory 430. The processor 420 and the memory 430 may therefore comprise computer-readable media.

Example eNodeB for Implementing Embodiments

Figure 5:
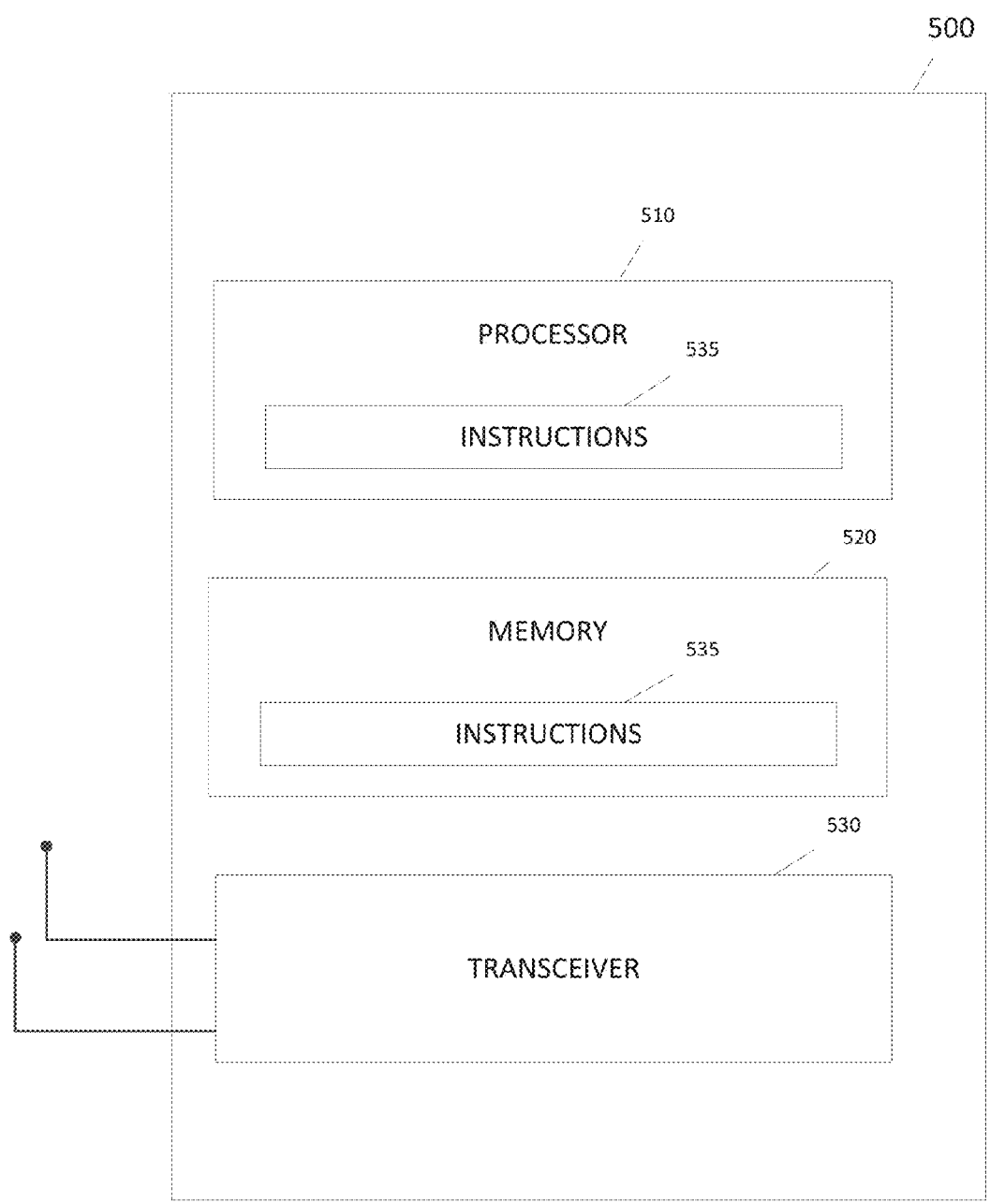
FIG. 5 is a block diagram showing details of an eNodeB according to some embodiments.

FIG. 5 is a block diagram showing details of an eNodeB 500 according to some embodiments. The eNodeB 500 may be suitable as an eNodeB 106 (FIG. 1). The eNodeB 500 may provide or assign UL resources to the UE 400 (FIG. 4) or device 102. The eNodeB 500 may include a processor 510, a memory 520, a transceiver 530, and instructions 535. The eNodeB 500 may include other elements (not shown).

The processor 510 comprises one or more central processing units (CPUs), graphics processing units (GPUs), or both. The processor 510 provides processing and control functionalities for the eNodeB 500. Memory 520 comprises one or more transient and static memory units configured to store instructions 535 and data for the eNodeB 500.

The transceiver 530 comprises one or more transceivers including a multiple-input and multiple-output (MIMO) antenna to support MIMO communications. The transceiver 530 receives UL transmissions and transmits DL transmissions, among other things, from and to devices 102 (FIG. 1).

The instructions 535 comprise one or more sets of instructions or software executed on a computing device (or machine) to cause such computing device (or machine) to perform any of the methodologies discussed herein. The instructions 535 (also referred to as computer- or machine-executable instructions) may reside, completely or at least partially, within the processor 510 and/or the memory 520 during execution thereof by the eNodeB 500. The processor 510 and memory 520 also comprise machine-readable media.

The processor 510 may determine that the device 102 is a machine-type communications (MTC) UE and that the transmission is for a low-priority application. The processor 510 may determine this based on an amount of data in the transmission and on a logical channel on which the transmission was transmitted.

The processor 510 may configure a radio resource control (RRC) configuration message for transmission to the device 102. The RRC configuration message may include subframe restriction data indicating UL subframes for which the UE is restricted from transmitting. The RRC configuration message may include a plurality of subframe restriction configurations. A first configuration of the plurality of configurations may restrict device 102 UL transmissions on a subframe that is not restricted by a second configuration of the plurality of configurations. However, example embodiments are not limited to non-overlapping configurations. For example, the first configuration may restrict in a subset of subframes that are also restricted by the second configuration. The processor 510 may configure a second message for indicating which configuration of the plurality of configurations is to be used by the device 102. The second message may include PDCCH DCI formatted in accordance with a standard of the 3GPP family of standards for long term evolution (LTE). The second message may include a medium access control (MAC) Control Element formatted in accordance with a standard of the (3GPP family of standards for long term evolution (LTE).

As those skilled in the art will readily appreciate, various aspects described throughout this disclosure may be extended to other telecommunication systems, network architectures and communication standards. By way of non-limiting example, various aspects may be extended to other Universal Mobile Telecommunications System (UMTS) systems. Various aspects can be used in systems employing Long Term Evolution (LTE) (in FDD, TDD, or both modes), and LTE-Advanced (LTE-A) (in FDD, TDD, or both modes).

Examples, as described herein, may include, or may operate on, logic or a number of components, components, or mechanisms. Components are tangible entities capable of performing specified operations and may be configured or arranged in a certain manner. In an example, circuits may be arranged (e.g. internally or with respect to external entities such as other circuits) in a specified manner as a component. In an example, the whole or part of one or more computer systems (e.g. a standalone, client or server computer system) or one or more hardware processors may be configured by firmware or software (e.g. instructions, an application portion, or an application) as a component that operates to perform specified operations. In an example, the software may reside (1) on a non-transitory machine-readable medium or (2) in a transmission signal. In an example, the software, when executed by the underlying hardware of the component, causes the hardware to perform the specified operations.

Accordingly, the terms "component" and "component" are understood to encompass a tangible entity, be that an entity that is physically constructed, specifically configured (e.g. hardwired), or temporarily (e.g. transitorily) configured (e.g. programmed) to operate in a specified manner or to perform part or all of any operation described herein. Considering examples in which components are temporarily configured, one instantiation of a component may not exist simultaneously with another instantiation of the same or different component. For example, where the components comprise a general-purpose hardware processor configured using software, the general-purpose hardware processor may be configured as respective different components at different times. Accordingly, software may configure a hardware processor, for example, to constitute a particular component at one instance of time and to constitute a different component at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

ADDITIONAL NOTES & EXAMPLES

Example 1 may include subject matter (such as a method, means for performing acts, machine readable medium including instructions that, when performed by a machine cause the machine to performs acts, or an apparatus configured to perform), comprising transmitting first data on a logical uplink channel, the logical uplink channel having been mapped for transmission of machine-type communications (MTC) application data; receiving transmission time restriction information, in a radio resource control (RRC) signal from an evolved Node B (eNodeB) in accordance with a standard of the 3GPP family of standards, the transmission time restriction information including an information element (IE) to identify a Data Radio Bearer (DRB) and the logical uplink channel for which the transmission time restriction applies, and the transmission time restriction information further including an IE to identify time periods for which uplink transmission is permitted for the UE; and refraining from transmitting in a subframe of an uplink channel based on the transmission time restriction information.

Example 2 may include, or may optionally be combined with the subject matter of Example 1 to optionally include an aspect wherein the transmission time restriction IE includes a subframe restriction bitmap for indicating subframes for which the UE is permitted to transmit on the logical uplink channel.

Example 3 may include, or may optionally be combined with the subject matter of Examples 1 and/or 2 to optionally include an aspect wherein the transmission time restriction IE includes a plurality of subframe restriction bitmaps, and the method further comprises receiving an index value, in physical downlink control channel (PDCCH) downlink control information (DCI) or in a medium access control (MAC) control element, indicating which of the plurality of subframe restriction bitmaps to use for the refraining.

Example 4 may include, or may optionally be combined with the subject matter of any of Examples 1-3, to optionally include an aspect wherein the UE includes a first application with a first priority level and a second application with a second priority level lower than the first priority level; and the UE transmits, subsequent to receiving transmission time restriction information, data for the first application in a time period for which the UE refrains from transmitting data for the second application.

Example 5 may include, or may optionally be combined with the subject matter of any of Examples 1-4, to optionally include receiving a logical channel configuration information element (IE) that includes threshold information for a delay parameter for a logical uplink channel, the threshold information being based on an identity of the second uplink logical channel, on a type of an application for which the data is to be transmitted, or on an identity of the UE; determining whether to transmit an uplink scheduling request (SR) to request resources for transmitting application data, based on a value of a delay parameter and on the threshold information; and refraining from transmitting the uplink SR if the value of the delay parameter is below the threshold.

Example 6 may include subject matter (such as a method, means for performing acts, machine readable medium including instructions that, when performed by a machine cause the machine to performs acts, or an apparatus configured to perform), which may optionally be in addition to any one or combination of Examples 1-5, comprising determining, by an eNodeB, based on a transmission received on an uplink connection from a user equipment (UE), whether the UE is a machine-type communications (MTC) UE and whether the transmission is for a low-priority application; and configuring a radio resource control (RRC) configuration message for transmission to the UE, the RRC configuration message including subframe restriction data indicating uplink subframes for which the UE is restricted from transmitting.

Example 7 may include, or may optionally be combined with the subject matter of any of Examples 1-6, to optionally include an aspect wherein the determining includes examining an amount of data in the transmission and an identity of a logical channel on which the transmission was transmitted.

Example 8 may include, or may optionally be combined with the subject matter of any of Examples 1-7, to optionally include an aspect wherein the RRC configuration message includes a plurality of subframe restriction configurations, a first configuration of the plurality of configurations restricting UE uplink transmissions on a subframe that is not restricted by a second configuration of the plurality of configurations; and transmitting an index value, in physical downlink control channel (PDCCH) downlink control information (DCI) or a medium access control (MAC) control element formatted in accordance with a standard of the (3GPP family of standards for long term evolution (LTE), to indicate which of the plurality of subframe restriction configurations is to be used by the UE for determining subframes for which uplink transmission is prohibited.

Example 9 may include subject matter (such as an apparatus, mobile apparatus, MTC device, user equipment, network device, eNodeB, communication apparatus or device, hardware, component, or component), which may optionally be in addition to any one or combination of Examples 1-8, comprising physical layer circuitry to transmit first data on a logical uplink channel, the logical uplink channel having been assigned for use by machine-type communications (MTC) applications; receive transmission time restriction information, responsive to the transmitting, that indicates time periods during which the UE is permitted to transmit additional data on the logical uplink channel; and refrain from transmitting additional data in a time period on the logical uplink channel based on the transmission time restriction information.

Example 10 may include subject matter (such as an apparatus, mobile apparatus, MTC device, user equipment, network device, eNodeB, communication apparatus or device, hardware, component, or component), which may optionally be in addition to any one or combination of Examples 1-9, to optionally include an aspect wherein the transmission time restriction information is received in a radio resource control (RRC) signal from an evolved Node B (eNodeB) in accordance with a standard of the 3GPP family of standards, the RRC signal including an information element (IE) to identify a Data Radio Bearer (DRB) and the logical uplink channel for which the transmission time restriction applies, and the signal including a transmission time restriction IE.

Example 11 may include subject matter (such as an apparatus, mobile apparatus, MTC device, user equipment, network device, eNodeB, communication apparatus or device, hardware, component, or component), which may optionally be in addition to any one or combination of Examples 1-10, to optionally include an aspect wherein the transmission time restriction IE includes a subframe restriction bitmap for indicating subframes for which the UE is permitted to transmit on the logical uplink channel.

Example 12 may include subject matter (such as an apparatus, mobile apparatus, MTC device, user equipment, network device, eNodeB, communication apparatus or device, hardware, component, or component), which may optionally be in addition to any one or combination of Examples 1-11, to optionally include an aspect wherein the transmission time restriction IE includes a plurality of subframe restriction bitmaps, and the UE is configured to receive an index value, in physical downlink control channel (PDCCH) downlink control information (DCI), indicating which of the plurality of subframe restriction bitmaps to use for the refraining.

Example 13 may include subject matter (such as an apparatus, mobile apparatus, MTC device, user equipment, network device, eNodeB, communication apparatus or device, hardware, component, or component), which may optionally be in addition to any one or combination of Examples 1-12, to optionally include an aspect wherein the transmission time restriction IE includes a plurality of subframe restriction bitmaps, and the UE is configured to receive an index value, in a medium access control (MAC) control element indicating which of the plurality of subframe restriction bitmaps to use for the refraining Example 14 may include subject matter (such as an apparatus, mobile apparatus, MTC device, user equipment, network device, eNodeB, communication apparatus or device, hardware, component, or component), which may optionally be in addition to any one or combination of Examples 1-13, to optionally include an aspect wherein the UE includes a first application with a first priority level and a second application with a second priority level lower than the first priority level, the refraining includes refraining from transmitting data of the second application, and the UE is further configured to, subsequent to receiving transmission time restriction information, transmit data for the first application on another logical uplink channel separate from the logical uplink channel on which the UE refrains from transmitting data for the second application.

Example 15 may include subject matter (such as an apparatus, mobile apparatus, MTC device, user equipment, network device, eNodeB, communication apparatus or device, hardware, component, or component), which may optionally be in addition to any one or combination of Examples 1-14, to optionally include an aspect wherein the UE receives and store application data to be transmitted on an uplink resource, determines whether to transmit an uplink scheduling request (SR) to request resources for transmitting the buffered data, based on a value of a delay parameter, and refrains from transmitting the uplink SR if the value of the delay parameter is below a threshold.

Example 16 may include subject matter (such as an apparatus, mobile apparatus, MTC device, user equipment, network device, eNodeB, communication apparatus or device, hardware, component, or component), which may optionally be in addition to any one or combination of Examples 1-15, to optionally include an aspect wherein the UE applies the transmission time restriction data for determining whether to refrain from transmitting on a first uplink logical channel, and applies the delay parameter for determining whether to refrain from transmitting the uplink SR on a second logical uplink channel different from the first logical uplink channel.

Example 17 may include subject matter (such as an apparatus, mobile apparatus, MTC device, user equipment, network device, eNodeB, communication apparatus or device, hardware, component, or component), which may optionally be in addition to any one or combination of Examples 1-16, to optionally include an aspect wherein threshold information for the delay parameter is based on an identity of the second uplink logical channel, on a type of an application for which the data is to be transmitted, or on an identity of the UE, and the threshold information is included in a logical channel configuration information element (IE) transmitted in accordance with a standard of the 3GPP family of standards.

Example 18 may include subject matter (such as an apparatus, mobile apparatus, MTC device, user equipment, network device, eNodeB, communication apparatus or device, hardware, component, or component), which may optionally be in addition to any one or combination of Examples 1-17, comprise transceiver arranged to receive a transmission on an uplink connection from a user equipment (UE); and a processor arranged to determine that the UE is a machine-type communications (MTC) UE and that the transmission is for a low-priority application, and configure a radio resource control (RRC) configuration message for transmission to the UE, the RRC configuration message including subframe restriction data indicating uplink subframes for which the UE is restricted from transmitting.

Example 19 may include subject matter (such as an apparatus, mobile apparatus, MTC device, user equipment, network device, eNodeB, communication apparatus or device, hardware, component, or component), which may optionally be in addition to any one or combination of Examples 1-18, to optionally include an aspect wherein the determining is based on an amount of data in the transmission and on a logical channel on which the transmission was transmitted.

Example 20 may include subject matter (such as an apparatus, mobile apparatus, MTC device, user equipment, network device, eNodeB, communication apparatus or device, hardware, component, or component), which may optionally be in addition to any one or combination of Examples 1-19, to optionally include an aspect wherein the RRC configuration message includes a plurality of subframe restriction configurations, a first configuration of the plurality of configurations restricting UE uplink transmissions on a subframe that is not restricted by a second configuration of the plurality of configurations; and the one or more processors are arranged to configure a second message for indicating which configuration of the plurality of configurations is to be used by the UE.

Example 21 may include subject matter (such as an apparatus, mobile apparatus, MTC device, user equipment, network device, eNodeB, communication apparatus or device, hardware, component, or component), which may optionally be in addition to any one or combination of Examples 1-20, to optionally include an aspect wherein the second message includes physical downlink control channel (PDCCH) downlink control information (DCI) formatted in accordance with a standard of the 3GPP family of standards for long term evolution (LTE).

Example 22 may include subject matter (such as an apparatus, mobile apparatus, MTC device, user equipment, network device, eNodeB, communication apparatus or device, hardware, component, or component), which may optionally be in addition to any one or combination of Examples 1-21, to optionally include an aspect wherein the second message includes a medium access control (MAC) Control Element formatted in accordance with a standard of the 3GPP family of standards for long term evolution (LTE).

What is claimed is:

1. A user equipment (UE) comprising physical layer circuitry to:
   transmit first data on a logical uplink channel, the logical uplink channel having been assigned for use by machine-type communications (MTC) applications for transmission of MTC application data;
   receive transmission time restriction information, responsive to the transmitting, that indicates time periods during which the UE is permitted to transmit additional MTC data on the logical uplink channel; and
   refrain from transmitting additional MTC data in a time period on the logical uplink channel based on the transmission time restriction information, wherein the transmission time restriction information is received in a radio resource control (RRC) signal from an evolved Node B (eNodeB) in accordance with a standard of the $3^{rd}$ Generation Partnership Project (3GPP) family of standards, the RRC signal including an information element (IE) to identify a Data Radio Bearer (DRB) and the logical uplink channel for which the transmission time restriction applies, and the RRC signal further including a transmission time restriction IE;
   wherein the transmission time restriction IE includes a subframe restriction bitmap for indicating subframes for which the UE is permitted to transmit on the logical uplink channel, and
   wherein the UE includes a first application with a first priority level and a second application with a second priority level, lower than the first priority level, the refraining includes refraining from transmitting data of the second application, and the UE is further configured to, subsequent to receiving transmission time restriction IE, transmit data for the first application on another logical uplink channel separate from the logical uplink channel in a time period on which the UE refrains from transmitting data for the second application.

2. The UE of claim 1, wherein the transmission time restriction IE includes a plurality of subframe restriction bitmaps, and the UE is configured to receive an index value, in physical downlink control channel (PDCCH) downlink control information (DCI), indicating which of the plurality of subframe restriction bitmaps to use for the refraining.

3. The UE of claim 1, wherein
the transmission time restriction IE includes a plurality of subframe restriction bitmaps, and
the UE is configured to receive an index value, in a medium access control (MAC) control element indicating which of the plurality of subframe restriction bitmaps to use for the refraining.

4. The UE of claim 1, wherein the UE is configured to:
receive and store application data to be transmitted on an uplink resource;
determine whether to transmit an uplink scheduling request (SR) to request resources for transmitting the buffered data, based on a value of a delay parameter; and
refrain from transmitting the uplink SR if the value of the delay parameter is below a threshold.

5. The UE of claim 4, wherein the UE is configured to:
apply the transmission time restriction data for determining whether to refrain from transmitting on a first uplink logical channel, and apply the delay parameter for determining whether to refrain from transmitting the uplink SR.

6. The UE of claim 5, wherein threshold information for the delay parameter is based on an identity of the second uplink logical channel, on a type of an application for which the data is to be transmitted, or on an identity of the UE, and the threshold information is included in a logical channel configuration information element (IE) transmitted in accordance with a standard of the $3^{rd}$ Generation Partnership Project (3GPP) family of standards.

7. An evolved NodeB (eNodeB) comprising:
a transceiver arranged to receive a transmission on an uplink connection from a user equipment (UE); and
a processor arranged to:
determine that the UE is a machine-type communications (MTC) UE and that the transmission is for a low-priority application wherein the determining is based on an amount of data in the transmission and on a logical channel on which the transmission was transmitted, wherein a low priority MTC communication is received on a first logical channel and a high priority MTC communication is received on a second logical channel different from the first logical channel; and
based on the determining, configure a radio resource control (RRC) configuration message for transmission to the UE, the RRC configuration message including an information element (IE) including information identifying a Data Radio Bearer (DRB) and the logical uplink channel for which the transmission time restriction applies, and the RRC message further including a transmission time restriction IE indicating uplink subframes for which the UE is restricted from transmitting;
wherein the transceiver is further arranged to receive additional MTC communications from the UE in a time period based on the transmission time restriction IE and wherein the high priority MTC communication is received on the second logical channel in a time period for which the UE refrains from transmitting low priority MTC communications on the first logical channel responsive to the transmission time restriction IE.

8. The eNodeB of claim 7, wherein the RRC configuration message includes a plurality of subframe restriction configurations, a first configuration of the plurality of configurations restricting UE uplink transmissions on a subframe that is not restricted by a second configuration of the plurality of configurations; and
the one or more processors are arranged to configure a second message for indicating which configuration of the plurality of configurations is to be used by the UE.

9. The eNodeB of claim 8, wherein the second message includes physical downlink control channel (PDCCH) downlink control information (DCI) formatted in accordance with a standard of the $3^{rd}$ Generation Partnership Project (3GPP) family of standards for long term evolution (LTE).

10. The eNodeB of claim 8, wherein the second message includes a medium access control (MAC) Control Element formatted in accordance with a standard of the $3^{rd}$ Generation Partnership Project (3GPP) family of standards for long term evolution (LTE).

11. A method, performed by user equipment (UE), for small data transmission, the method comprising:
transmitting first data on a logical uplink channel, the logical uplink channel having been mapped for transmission of machine-type communications (MTC) application data;
receiving transmission time restriction information, in a radio resource control (RRC) signal from an evolved Node B (eNodeB) in accordance with a standard of the $3^{rd}$ Generation Partnership Project (3GPP) family of standards, the transmission time restriction information including an information element (IE) to identify a Data Radio Bearer (DRB) and the logical uplink channel for which the transmission time restriction applies, and the transmission time restriction information further including a transmission time restriction IE including a pattern configuration field to identify time periods for which uplink transmission is permitted for the UE; and
refraining from transmitting in a subframe of an uplink channel based on the transmission time restriction information;
wherein the transmission time restriction IE includes a subframe restriction bitmap for indicating subframes for which the UE is permitted to transmit on the logical uplink channel; and;
wherein the UE includes a first application with a first priority level and a second application with a second priority level lower than the first priority level, and the method further comprises:
transmitting, subsequent to receiving transmission time restriction information, data for the first application in a time period for which the UE refrains from transmitting data for the second application.

12. The method of claim 11, wherein the transmission time restriction IE includes a plurality of subframe restriction bitmaps, and the method further comprises receiving an index value, in physical downlink control channel (PDCCH) downlink control information (DCI) or in a medium access control (MAC) control element, indicating which of the plurality of subframe restriction bitmaps to use for the refraining.

13. The method of claim 11, further comprising:
receiving a logical channel configuration information element (IE) that includes threshold information for a delay parameter for a logical uplink channel, the threshold information being based on an identity of the second uplink logical channel, on a type of an application for which the data is to be transmitted, or on an identity of the UE;

determining whether to transmit an uplink scheduling request (SR) to request resources for transmitting application data, based on a value of a delay parameter and on the threshold information; and refraining from transmitting the uplink SR if the value of the delay parameter is below the threshold.

14. A method, performed by an evolved Node B (eNodeB), for controlling small data transmissions on an uplink resource, the method comprising:

determining, based on a transmission received on an uplink connection from a user equipment (UE), whether the UE is a machine-type communications (MTC) UE and whether the transmission is for a low-priority application, wherein the determining is based on an amount of data in the transmission and on a logical channel on which the transmission was transmitted, wherein a low priority MTC communication is received on a first logical channel and a high priority MTC communication is received on a second logical channel different from the first logical channel;

based on the determining, configuring a radio resource control (RRC) configuration message for transmission to the UE, the RRC configuration message including an information element (IE) including information identifying a Data Radio Bearer (DRB), the logical uplink channel for which the transmission time restriction applies, and the RRC configuration message further including a transmission time restriction IE including subframe restriction data indicating uplink subframes for which the UE is restricted from transmitting;

wherein the method further includes receiving additional MTC communications from the UE in a time period based on the transmission time restriction IE and wherein the high priority MTC communication is received on the second logical channel in a time period for which the UE refrains from transmitting low priority MTC communications on the first logical channel responsive to the transmission time restriction IE.

15. The method of claim 14, wherein the RRC configuration message includes a plurality of subframe restriction configurations, a first configuration of the plurality of configurations restricting UE uplink transmissions on a subframe that is not restricted by a second configuration of the plurality of configurations, and the method comprises:

transmitting an index value, in physical downlink control channel (PDCCH) downlink control information (DCI) or a medium access control (MAC) control element formatted in accordance with a standard of the $3^{rd}$ Generation Partnership Project (3GPP) family of standards for long term evolution (LTE), to indicate which of the plurality of subframe restriction configurations is to be used by the UE for determining subframes for which uplink transmission is prohibited.

* * * * *